US012792907B2

(12) United States Patent
Sakai

(10) Patent No.: US 12,792,907 B2
(45) Date of Patent: Nov. 10, 2026

(54) COMPUTER-READABLE RECORDING MEDIUM HAVING STORED THEREIN MACHINE LEARNING PROGRAM, METHOD FOR MACHINE LEARNING, AND INFORMATION PROCESSING APPARATUS

(71) Applicant: Fujitsu Limited, Kawasaki (JP)

(72) Inventor: Yasufumi Sakai, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 1018 days.

(21) Appl. No.: 17/984,285

(22) Filed: Nov. 10, 2022

(65) Prior Publication Data

US 2023/0281440 A1 Sep. 7, 2023

(30) Foreign Application Priority Data

Mar. 4, 2022 (JP) ................................ 2022-033798

(51) Int. Cl.
*G06N 3/08* (2023.01)
*G06F 17/16* (2006.01)

(52) U.S. Cl.
CPC ............... *G06N 3/08* (2013.01); *G06F 17/16* (2013.01)

(58) Field of Classification Search
CPC ........ G06N 3/08; G06N 3/0495; G06N 3/084; G06N 3/082; G06N 3/0464; G06F 17/16
See application file for complete search history.

(56) References Cited

U.S. PATENT DOCUMENTS

2019/0080238 A1 3/2019 Wang et al.
2022/0319238 A1* 10/2022 Kim ...................... G06V 40/40

FOREIGN PATENT DOCUMENTS

JP 2019-049977 A 3/2019

OTHER PUBLICATIONS

Chen, Z., Niu, J., Xie, L., Liu, X., Wei, L. and Tian, Q., 2020. Network adjustment: Channel search guided by flops utilization ratio. In Proceedings of the IEEE/CVF conference on computer vision and pattern recognition (p. 10658-10667) (Year: 2020) .*

(Continued)

*Primary Examiner* — Abdullah Al Kawsar
(74) *Attorney, Agent, or Firm* — Fujitsu Intellectual Property Center

(57) ABSTRACT

A method including: obtaining a reduction ratio of each element of layers in a trained model of a neural network; when the neural network includes a process that outputs a tensor as a result of a given calculation on tensors and when tensors from first layers preceding the process are inputted, inserting a second layer that performs a zero padding between the first layers and the process, the first layers including a preceding layer of the process and including one or more layers preceding the preceding layer and being shortcut-connected to the process; and padding tensors inputted into second layers associated one with each first layer with one or more zero matrices such that a number of elements of each tensor inputted into the process from the first layers after reducing of elements of each first layer in accordance with the reduction ratio comes to be a first number.

9 Claims, 36 Drawing Sheets

(56) References Cited

OTHER PUBLICATIONS

Huang, B., Reichman, D., Collins, L.M., Bradbury, K. and Malof, J.M., 2018. Dense labeling of large remote sensing imagery with convolutional neural networks: a simple and faster alternative to stitching output label maps. arXiv preprint arXiv:1805.12219 (Year: 2018).*

Schraudolph, N.N., 1998. Slope Centering: Making Shortcut Weights Effective (Year: 1998).*

Extended European Search Report dated Jun. 23, 2023 for corresponding European Patent Application No. 22209303.1, 7 pages.

Glinserer, Andreas et al., "Automated Pruning of Neural Networks for Mobile Applications", Proceedings of the IEEE 19th International Conference on Industrial Informatics (INDIN'21), Jul. 21, 2021, 6 pages, XP033987203.

Luo, Jian-Hao et al., "Neural Network Pruning with Residual-Connections and Limited-Data", Proceedings of the 2020 IEEE/CVF Conference on Computer Vision and Pattern Recognition (CVPR'20), Jun. 13, 2020, pp. 1455-1464, XP033803710.

Chen, Siang et al., "Fine-Grained Channel Pruning for Deep Residual Neural Networks", Lecture Notes in Computer Science, vol. 12397, Oct. 14, 2020, pp. 3-14, XP047567016.

Japanese Office Action dated Aug. 19, 2025 for corresponding Japanese Patent Application No. 2022-033798, with Partial English Translation, 6 pages.

* cited by examiner

FIG. 25

| | Model | Accuracy before pruning (%) | Accuracy after pruning (%) | Compression ratio of data size of model after pruning (%) |
|---|---|---|---|---|
| Not pruning input layer into Concat unit | Res32 | 92.63 | 92.63 | 63.7 |
| Applying zero padding process | Res32 | 92.63 | 92.65 | **68.5** |
| Not pruning input layer into Concat unit | Res56 | 93.39 | 93.71 | 66.3 |
| Applying zero padding process | Res56 | 93.39 | 93.72 | **66.5** |
| Not pruning input layer into Concat unit | Res110 | 93.68 | 93.70 | 81.6 |
| Applying zero padding process | Res110 | 93.68 | 93.77 | **83.4** |

FIG.26

| Layer Name | Before pruning | After pruning (without application) | After applying **(with application)** |
|---|---|---|---|
| Conv1 | 16 | 16 | 11 |
| L1_0_Conv1 | 16 | 8 | 13 |
| **L1_0_Conv2** | **16** | **16** | **13** |
| L1_1_Conv1 | 16 | 8 | 13 |
| **L1_1_Conv2** | **16** | **16** | **13** |
| L1_2_Conv1 | 16 | 8 | 12 |
| **L1_2_Conv2** | **16** | **16** | **10** |
| L1_3_Conv1 | 16 | 8 | 13 |
| **L1_3_Conv2** | **16** | **16** | **7** |
| L1_4_Conv1 | 16 | 6 | 10 |
| **L1_4_Conv2** | **16** | **16** | **9** |
| L2_0_Conv1 | 32 | 17 | 23 |
| **L2_0_Conv2** | **32** | **32** | **21** |
| L2_1_Conv1 | 32 | 9 | 17 |
| **L2_1_Conv2** | **32** | **32** | **16** |
| L2_2_Conv1 | 32 | 12 | 21 |
| **L2_2_Conv2** | **32** | **32** | **12** |
| L2_3_Conv1 | 32 | 15 | 21 |
| **L2_3_Conv2** | **32** | **32** | **19** |
| L2_4_Conv1 | 32 | 12 | 19 |
| **L2_4_Conv2** | **32** | **32** | **11** |
| L3_0_Conv1 | 64 | 19 | 41 |
| **L3_0_Conv2** | **64** | **64** | **42** |
| L3_1_Conv1 | 64 | 19 | 41 |
| **L3_1_Conv2** | **64** | **64** | **24** |
| L3_2_Conv1 | 64 | 18 | 37 |
| **L3_2_Conv2** | **64** | **64** | **27** |
| L3_3_Conv1 | 64 | 22 | 27 |
| **L3_3_Conv2** | **64** | **64** | **20** |
| L3_4_Conv1 | 64 | 22 | 33 |
| **L3_4_Conv2** | **64** | **64** | **18** |
| linear | 10 | 10 | 10 |

COMPUTER-READABLE RECORDING MEDIUM HAVING STORED THEREIN MACHINE LEARNING PROGRAM, METHOD FOR MACHINE LEARNING, AND INFORMATION PROCESSING APPARATUS

CROSS-REFERENCE TO RELATED APPLICATION

This application is based upon and claims the benefit of priority of the prior Japanese Patent application No. 2022-033798, filed on Mar. 4, 2022, the entire contents of which are incorporated herein by reference.

FIELD

The embodiments discussed herein are related to a computer-readable recording medium having stored therein a machine learning program, a method for machine learning, and an information processing apparatus.

BACKGROUND

NNs (Neural Networks), which are used for AI (Artificial Intelligence) tasks such as image processing, tend to achieve high performance (e.g., high inference accuracy) with complex configurations. On the other hand, the complex configurations of NNs may increase the number of times of calculation in executing the NNs by calculators and the size of memory used in executing the NNs by the calculators.

As a method for reducing the number of times of calculation, in other words, shortening calculation durations (speeding up), and for reducing the size of memory, in other words, downsizing machine learning models of NNs, "pruning" has been known.

The pruning is a method for reducing the data size of the machine learning models and for reducing the calculation durations and communication durations by reducing (pruning) at least one type of elements among edges (weights), nodes, and channels of NNs.

Excessive pruning causes degradation of inference accuracy of NNs. Therefore, it is important to perform pruning of NNs while maintaining the inference accuracy or while keeping the degraded level of inference accuracy at a predetermined level.

For example, in pruning, a known method selects a layer that does not significantly affect the inference accuracy of NNs. This method, for example, determines a channel of a convolutional layer to be pruned based on parameters used in a Batch Normalization (BN) layer that follows a convolutional layer.

[Patent Document 1] Japanese Laid-open Patent Publication No. 2019-49977

The method for selecting the layer that does not significantly affect the inference accuracy of NNs is applied to the convolutional layer to which the BN layer is connected, but is not assumed to be applied to other layers such as the convolutional layers to which no BN layer is connected or fully connected layers.

An NN including multiple layers sometimes includes a concatenating calculating unit that performs a concatenating operation that concatenates inputs from two or more layers. Hereinafter, a concatenating operation is sometimes referred to as a "concat operation" and a concatenating calculating unit is sometimes referred to as a "concat unit".

The concat unit performs an arithmetic operation that shortcut-connects a tensor from a certain layer and tensors inputted from one or more layers preceding the certain layer and outputs one tensor. For example, the shortcut-connecting includes an operation on such inputted tensors, which operation is exemplified by addition in units of dimension and element.

For example, an NN is assumed to include a concat unit under a circumstance where a scheme to select a layer that does not largely affect the inference accuracy of the NNs can be applied to the above multiple layers. Under this circumstance, pruning in the above scheme may mismatch the dimensions (matrix sizes) of the tensors between two or more layers that input the tensors into the concat unit, and has a possibility that an output of the correct result of the calculation is not obtained from the concat unit.

To avoid such inconvenience, one of the solutions may exclude the two or more layers that input tensors into the concat unit from layers of targets of pruning. However, this solution lowers the pruning rate of overall model to be trained through a machine learning technique, and consequently, lowers the effect brought by compression (size reduction) of data size of the model to be trained by the pruning.

SUMMARY

According to an aspect of the embodiments, a non-transitory computer-readable recording medium has stored therein a machine learning program for causing a computer to execute a process including: obtaining a reduction ratio of each element of a plurality of layers in a trained model of a neural network including the plurality of layers; when the neural network includes a calculating process that outputs a tensor serving as a result of a given calculation on a plurality of tensors to be inputted into the calculating process and when tensors from a plurality of first layers preceding the calculating process are inputted into the calculating process, inserting a second layer that performs a zero padding process between the plurality of first layers and the calculating process, the plurality of first layers including a preceding layer of the calculating process and one or more layers preceding the preceding layer, the one or more layers being shortcut-connected to the calculating process; and padding tensors inputted into a plurality of the second layers associated one with each of the plurality of first layers with one or more zero matrices such that a number of elements of each of a plurality of tensors inputted into the calculating process from the plurality of first layers after reducing of elements of each of the plurality of first layers in accordance with the reduction ratio comes to be a first number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 25 is a diagram illustrating an example of accuracy before and after pruning of an NN and a compression ratio of a data size with or without a zero padding process;

FIG. 26 is a diagram illustrating an example of the number of output channels of each layer of an NN with or without a zero padding process;

DESCRIPTION OF EMBODIMENT(S)

Figure 1:
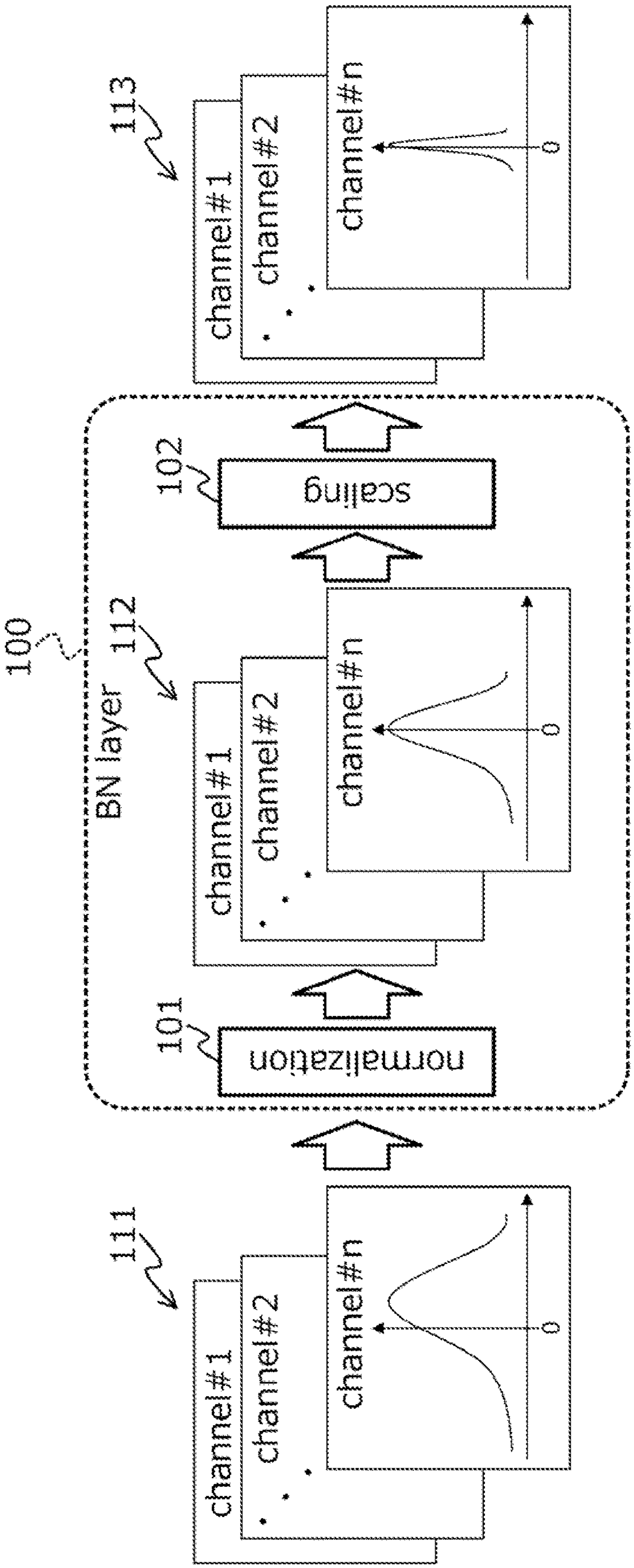
FIG. 1 is a diagram for explaining an example of a process that determines a channel of a convolutional layer to be pruned.

Hereinafter, an embodiment of the present disclosure will now be described with reference to the drawings. However, the embodiment described below is merely illustrative and there is no intention to exclude the application of various modifications and techniques that are not explicitly described in the embodiment. For example, the present embodiment can be variously modified and implemented without departing from the scope thereof. In the drawings used in the following description, the same reference numerals denote the same or similar parts unless otherwise specified.

<1> One Embodiment

Figure 2:
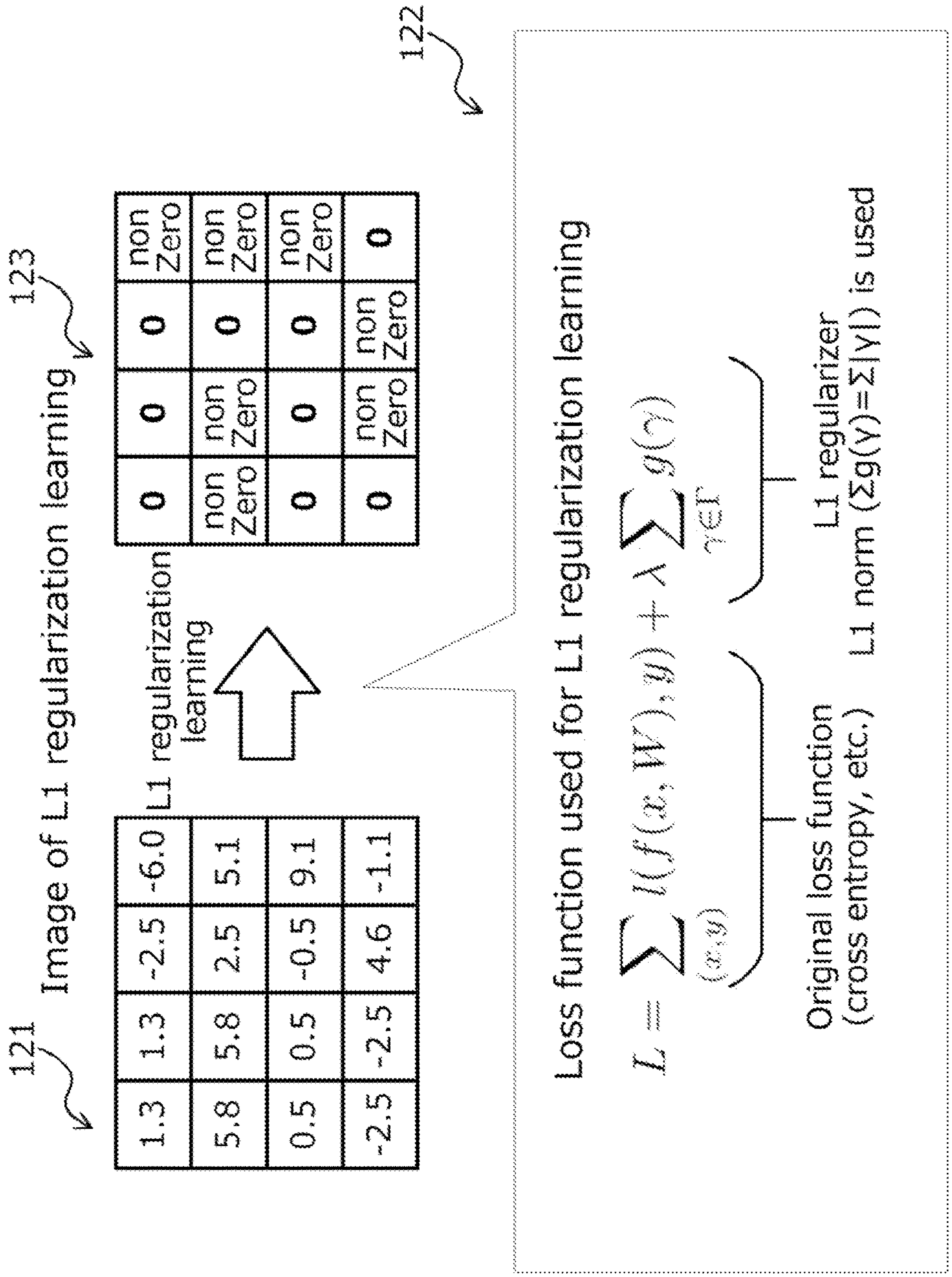
FIG. 2 is a diagram illustrating an example of L1 regularization learning.

FIG. 1 is a diagram for explaining an example of a process that determines a channel of a convolutional layer to be pruned, and FIG. 2 is a diagram illustrating an example of L1 regularization learning. As a method for selecting a layer that does not significantly affect inference accuracy of an NN, FIG. 1 illustrates a method in which a calculator uses a scaling factor γ used in a BN layer 100 that follows a convolutional layer to determine a channel of a convolutional layer to be pruned. The graphs illustrated in channels 111 to 113 in FIG. 1 represent distribution of output tensors.

As depicted in FIG. 1, the calculator executes a normalization 101 for each of multiple channels 111 (#1 to #n; n is an integer of 2 or more) inputted from a convolutional layer to the BN layer 100. For example, in the normalization 101, in accordance with the following equation (1), the calculator calculates a mean value μ and a variance $\sigma^2$ for each channel 111 to obtain multiple channels 112 (#1 to #n) that represent normalized distribution of mean "0" and variance "1". In the following equation (1), $z_{in}$ and $z_{mid}$ represent channels 111 and 112, respectively, and $\mu_B$ and $$\sigma_B^2$$

represent the mean value and the variance in the current mini-batch B, respectively.

[Equation 1]

$$z_{mid} = \frac{z_{in} - \mu_B}{\sqrt{\sigma_B^2 + \epsilon}} \frac{z_{in} - \mu_B}{\sqrt{\sigma_B^2 + \epsilon}} \tag{1}$$

The calculator executes scaling 102 for the multiple channels 112 (#1 to #n). For example, in the scaling 102, in accordance with the following equation (2), the calculator multiplies each of the multiple channels 112 by the scaling factor γ, and adds a bias β to the multiplication result to output multiple channels 113 (#1 to #n) that represent distribution scaled by the parameters γ and β. In the following equation (2), $z_{out}$ represents the channels 113. The parameters γ and β may be optimized by machine learning.

[Equation 2]

$$z_{out} = \gamma z_{mid} + \beta \quad (2)$$

At this step, the output is almost eliminated for the channel 113 (channel #n in the example of FIG. 1) resulted from the scaling 102 when γ is small. This means that inference accuracy of the NN is not significantly affected even if the channel is deleted by pruning. Thus, the calculator determines the channel as a pruning target in units of channels by searching for a small (e.g., "0") γ.

For example, the calculator searches for a small (diminishing) γ by applying L1 regularization learning to γ. The L1 regularization learning is a machine learning technique known to be capable of making a parameter to be learned "sparse" by performing machine learning while adding a regularizer of L1 to a loss function calculated by the NN at the output.

As illustrated in FIG. 2, the calculator performs the L1 regularization learning using a loss function 122 on a vector 121 to obtain a vector 123 on which the L1 regularization has been performed. The loss function 122 may be, as expressed by the following equation (3), a function L obtained by adding an original loss function (first term) such as cross entropy and an L1 regularizer (second term) that uses an L1 norm (Σg(γ)=Σ|γ|)

[Equation 3]

$$L = \sum_{(x,y)} l(f(x, W), y) + \lambda \sum_{\gamma \in \Gamma} g(\gamma) \quad (3)$$

The L1 regularization learning causes each parameter of the vector 123 to indicate (dichotomize) whether each parameter of the vector 121 becomes zero or non-zero. By using such L1 regularization learning, the calculator can identify a channel(s) in which γ becomes zero (close to zero) as the channel of the pruning target.

The identification of the pruning target using the L1 regularization learning depicted in FIGS. 1 and 2 is applied to the convolutional layer to which the BN layer is connected, but is not assumed to be applied to other layers such as the convolutional layers to which no BN layer is connected and the fully connected layers.

Figure 3:
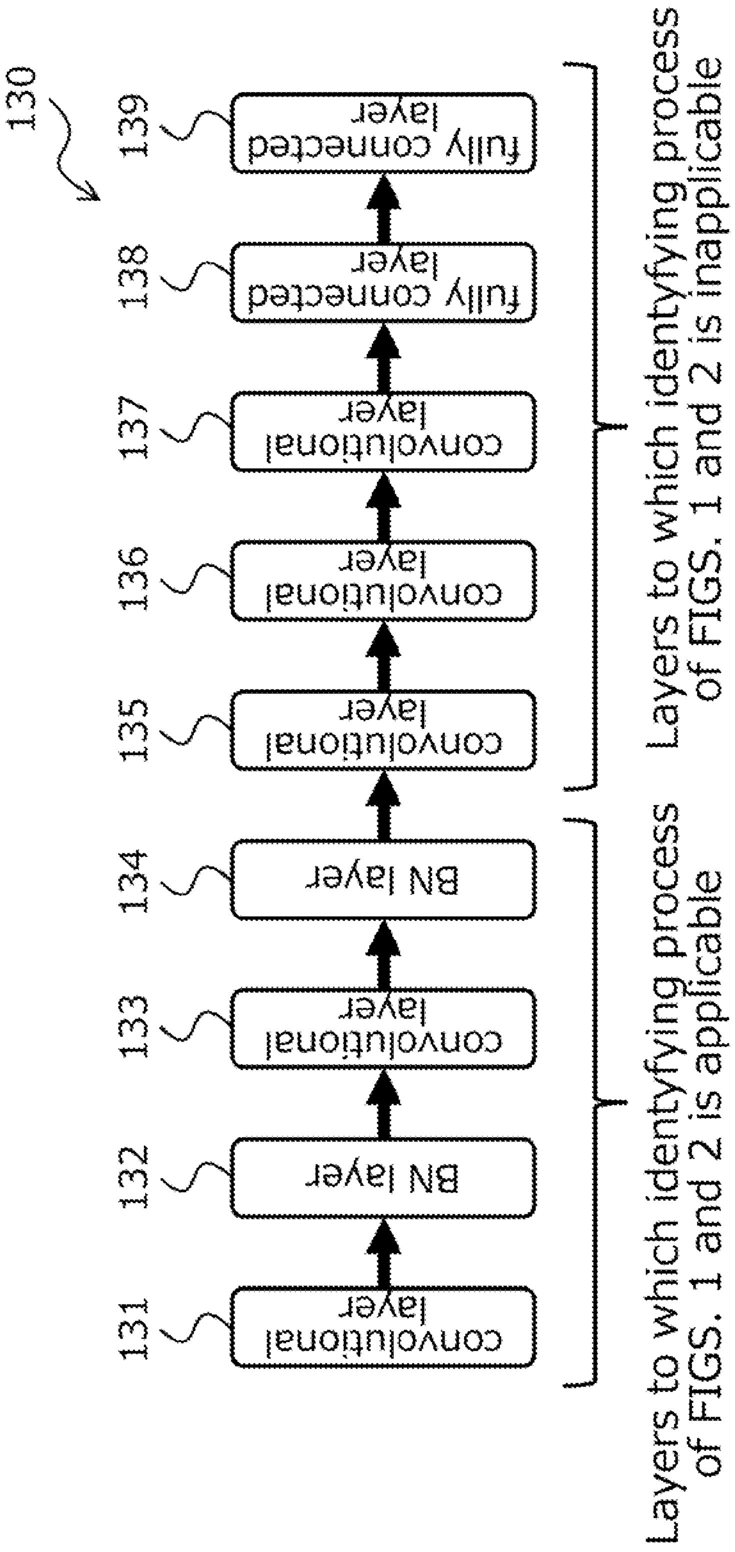
FIG. 3 is a diagram illustrating an example of whether the method of FIGS. 1 and 2 is applicable or inapplicable in layers of an NN.

FIG. 3 is a diagram illustrating an example of whether the method of FIGS. 1 and 2 is applicable or inapplicable in layers 131 to 139 of an NN 130. As depicted in FIG. 3, convolutional layers 131 and 133 and BN layers 132 and 134 are layers to which the L1 regularization learning depicted in FIGS. 1 and 2 is applicable, and convolutional layers 135 to 137 and fully connected layers 138 and 139 are layers to which the L1 regularization learning depicted in FIGS. 1 and 2 is inapplicable.

In view of the above, one embodiment describes a method for realizing downsizing of an NN by determining a pruning rate for each layer regardless of the type of layers.

Figure 4:
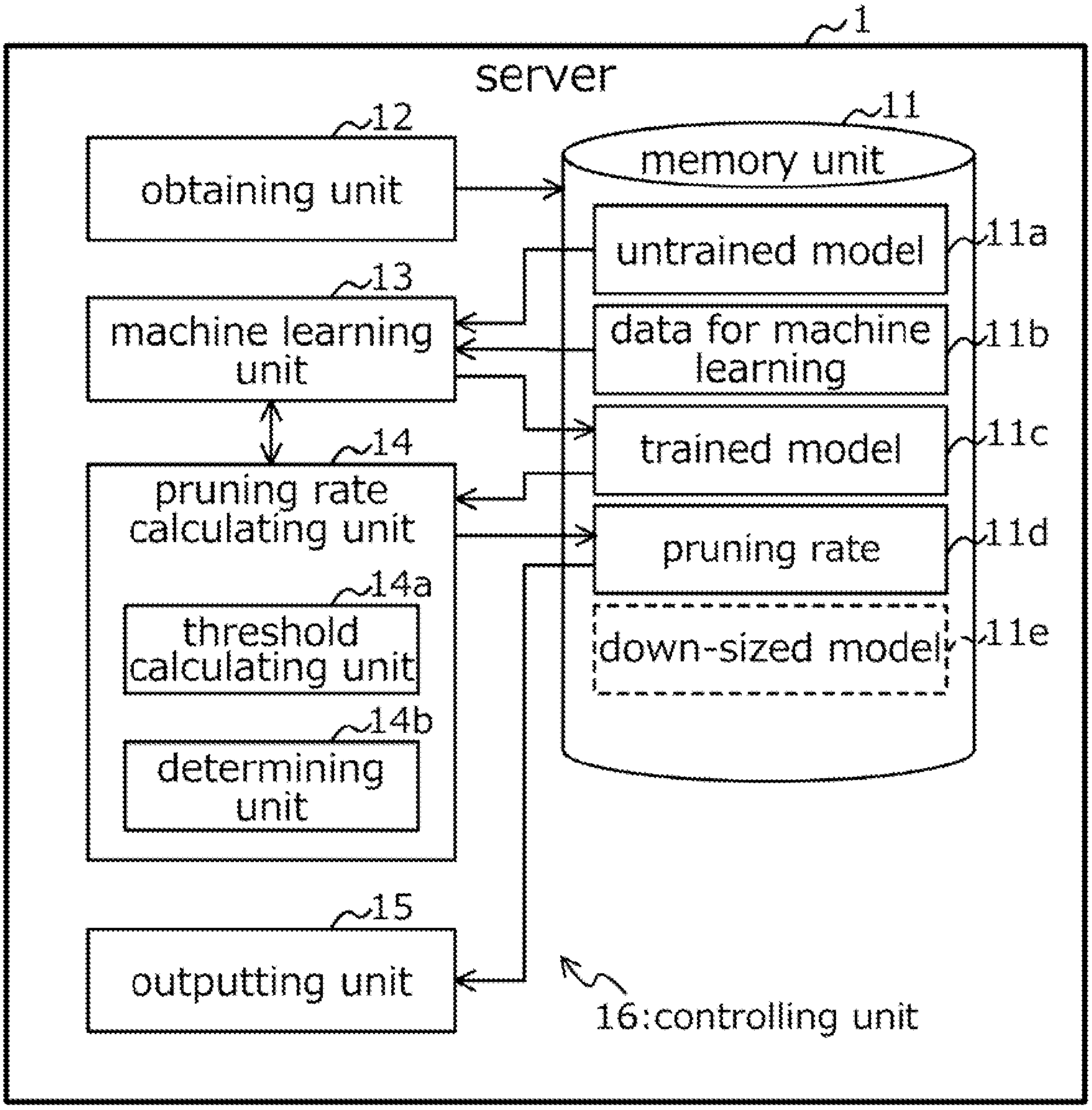
FIG. 4 is a block diagram illustrating an example of a functional configuration of a server according to one embodiment.

<1-1> Example of Functional Configuration of Server According to One Embodiment FIG. 4 is a block diagram illustrating an example of a functional configuration of a server 1 according to the one embodiment. The server 1 is an example of a calculator, a computer, or an information processing apparatus that outputs the pruning rate. As illustrated in FIG. 4, the server 1 may illustratively include a memory unit 11, an obtaining unit 12, a machine learning unit 13, a pruning rate calculation unit (hereinafter, simply referred to as a "calculation unit") 14, and an outputting unit 15. The obtaining unit 12, the machine learning unit 13, the calculating unit 14, and the outputting unit 15 are examples of a controlling unit 16.

The memory unit 11 is an example of a storage area, and stores various data to be used by the server 1. As illustrated in FIG. 4, the memory unit 11 may be illustratively capable of storing an untrained model 11*a*, data 11*b* for machine learning, a trained model 11*c*, pruning rates 11*d*, and a down-sized model 11*e*.

The obtaining unit 12 obtains the untrained model 11*a* and the data 11*b* for machine learning, and stores them in the memory unit 11. For example, the obtaining unit 12 may generate one of or both the untrained model 11*a* and the data 11*b* for machine learning in the server 1, or may receive them from a computer outside the server 1 via a non-illustrated network.

The untrained model 11*a* may be a model of the NN including the untrained parameters before machine learning. The NN may include various layers and may be, for example, a DNN (Deep NN). The NN may include, for example, a convolutional layer to which no BN layer is connected or a fully connected layer, or may include a convolutional layer to which a BN layer is connected, and may be, as an example, the NN 130 illustrated in FIG. 3.

The data 11*b* for machine learning may be, for example, a data set for training to be used for machine learning (training) of the untrained model 11*a*. For example, when machine learning is performed on an NN for realizing image processing, the data 11*b* for machine learning may include, for example, multiple pairs of labeled training data that includes training data such as image data and a ground truth label for the training data.

In the machine learning phase, the machine learning unit 13 executes a machine learning process that performs machine learning on the untrained model 11*a* based on the data 11*b* for machine learning. For example, the machine learning unit 13 may generate the trained model 11*c* by the machine learning process of the untrained model 11*a*. The trained model 11*c* may be an NN model including a trained parameter(s).

The trained model 11*c* may be obtained by updating a parameter included in the untrained model 11*a*, and may be regarded as, for example, a model as a result of a change from the untrained model 11*a* to the trained model 11*c* through the machine learning process. The machine learning process may be implemented by various known techniques.

The calculating unit 14 calculates the pruning rates 11*d* by executing a pruning rate calculation process for the trained model 11*c*, and stores them into the memory unit 11.

For example, the calculating unit 14 may include a threshold calculating unit 14*a* that calculates a threshold for selecting one of pruning rate candidates for each layer, and a determining unit 14*b* that determines, based on inference accuracy of the model pruned at the pruning rate candidates, the pruning rates 11*d* to be adopted.

The outputting unit 15 outputs output data based on the pruning rates 11*d* generated (obtained) by the calculating unit 14. The output data may include, for example, the pruning rates 11*d* themselves, the down-sized model 11*e*, or both.

The down-sized model 11*e* is data of a down-sized model of the trained model 11*c*, which is obtained by execution of pruning on the trained model 11*c* based on the pruning rates 11*d*. For example, in cooperation with the machine learning unit 13, the outputting unit 15 may acquire the down-sized model 11*e* by execution of pruning and re-learning on the trained model 11*c* while applying the pruning rates 11*d*, and may store the acquired model into the memory unit 11. The down-sized model 11*e* may be, for example, generated separately from the trained model 11*c*, or may be the updated data of the trained model 11*c* obtained through pruning and re-learning.

In outputting the output data, the outputting unit may, for example, transmit (provide) the output data to another non-illustrated computer, or may store the output data into the memory unit 11 and manage the output data to be acquirable from the server 1 or another computer. Alternatively, in outputting the output data, the outputting unit 15 may display information indicating the output data on an output device such as the server 1, or may output the output data in various other manners.

<1-2> Example of Pruning Rate Calculation Process

Next, an example of the pruning rate calculation process by the calculating unit 14 of the server 1 will be described. In the following description, a calculation target of the pruning rate is assumed to be a weight matrix W which is an example of a parameter of a layer.

The calculating unit 14 determines the pruning rate regardless of the type of layers by using errors in tensors for each layer, which errors are generated by pruning. As an example, the calculating unit 14 may calculate the pruning rate according to the following procedures (i) to (iii).

(i) The calculating unit 14 (threshold calculating unit 14*a*) determines (calculates), for each layer, the pruning rate that can guarantee the accuracy.

The term "guarantee the accuracy" means, for example, to guarantee that accuracy of inference (inference accuracy) using the down-sized model 11*e* obtained by pruning the trained model 11*c* exceeds a predetermined criterion.

Figure 5:
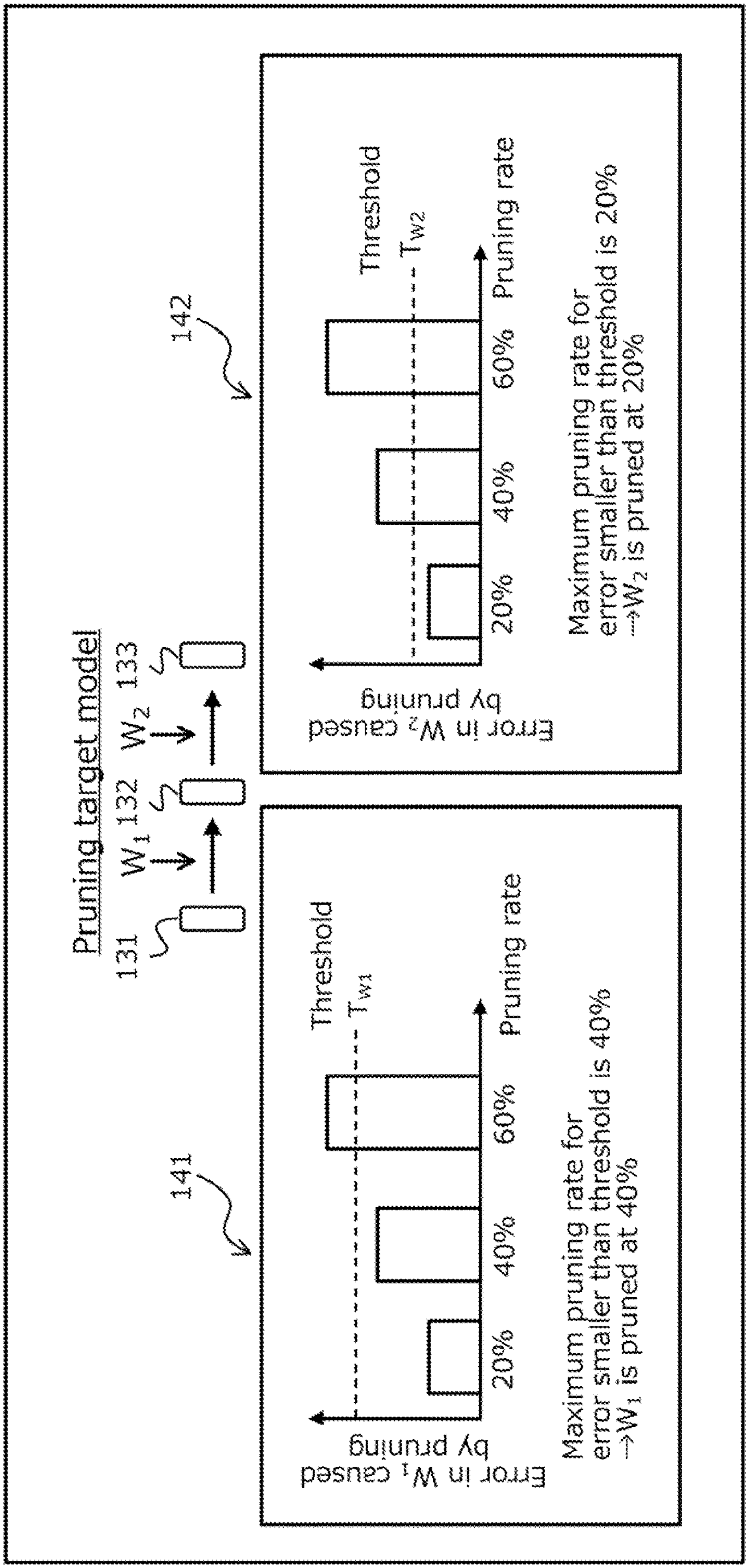
FIG. 5 is a diagram illustrating an example of calculating a pruning rate that can guarantee accuracy.

FIG. 5 is a diagram illustrating an example of calculating the pruning rate that can guarantee the accuracy. As illustrated in FIG. 5, in (i), the threshold calculating unit 14*a* determines, for each weight matrix W of the multiple layers, the pruning rate to be applied to the weight matrix W of each layer included in the trained model 11*c* of the pruning target. Although FIG. 5 focuses on the layers 131 to 133, the application of the description of FIG. 5 is not limited to these, and may be any of the layers 131 to 139 illustrated in FIG. 3.

Here, the pruning rate is an example of a ratio for reducing (reduction ratio) an element(s) of a layer and indicates a ratio for rendering the pruning target in the trained model 11*c* "sparse". In the example of FIG. 2, the pruning rate corresponds to the number of places set as "0" in the vector 123.

As illustrated in FIG. 5, the threshold calculating unit 14*a* selects, for each of the weight matrix $W_1$ of the layer 131 (weight matrix $W_1$ connected to the layer 132) and the weight matrix $W_2$ of the layer 132 (weight matrix $W_2$ connected to the layer 133), one pruning rate from multiple pruning rate candidates. The pruning rate candidates are examples of reduction ratio candidates, and may be, for example, two or more ratios between 0% and 100%, common to multiple layers, different in individual layers, or a combination thereof. In the example of FIG. 5, the pruning rate candidates are assumed to be 0%, 20%, 40%, and 60%.

For example, the threshold calculating unit 14*a* obtains an error in tensors between before and after pruning in cases where the pruning is performed for each pruning rate candidate, and determines the maximum pruning rate candidate among the pruning rate candidates with errors smaller than a threshold $T_w$. In the example of FIG. 5, for $W_1$, the threshold calculating unit 14*a* determines that the maximum pruning rate candidate with an error smaller than a threshold $T_{w1}$ is 40% (see arrow 141). In addition, for $W_2$, the threshold calculating unit 14*a* determines that the maximum pruning rate candidate with an error smaller than a threshold $T_{w2}$ is 20% (see arrow 142).

The threshold $T_w$ is a threshold of the error in the tensors between before and after the pruning, and is an upper limit of the pruning rate that can guarantee the accuracy. For example, the threshold calculating unit 14*a* may calculate the threshold $T_w$ for each layer by expressing the loss function at the time of pruning the pruning target by an approximate expression such as a first-order Taylor expansion. The details of the method for calculating the threshold $T_w$ will be described later.

The pruning rate calculated in (i) may be regarded as a "provisionally calculated" pruning rate in relation to processes of (ii) and (iii).

As described above, the threshold calculating unit 14*a* calculates the thresholds T of the errors in the tensors between before and after the reduction one for each element of the multiple layers in the trained model 11*c* of the NN including the multiple layers. The threshold calculating unit 14*a* selects the reduction ratio candidates to be applied one to each of the multiple layers based on the multiple thresholds T and the errors in the tensors between before and after the reduction in the cases where the elements are reduced by each of the multiple reduction ratio candidates in each of the multiple layers.

(ii) The calculating unit 14 (determining unit 14*b*) determines the pruning rate based on the accuracy of the machine learning model pruned (downsized) by using the pruning rate determined in (i) and the accuracy of the machine learning model that has not undergone pruning.

For example, the determining unit 14*b* considers the error caused by the approximate expression (first-order Taylor expansion), and compares the sum of accuracy $Acc_p$ of the model pruned at the pruning rate determined in (i) for each layer and an accuracy margin $Acc_m$ with accuracy $Acc_{wo}$ of an unpruned model. The accuracy margin $Acc_m$ is a margin for which the inference accuracy is allowed to be degraded, and may be set by a designer. The margin may be "0", and in this case, the determining unit 14*b* may compare the accuracy $Acc_p$ with the accuracy $Acc_{wo}$ of the unpruned model.

Figure 6:
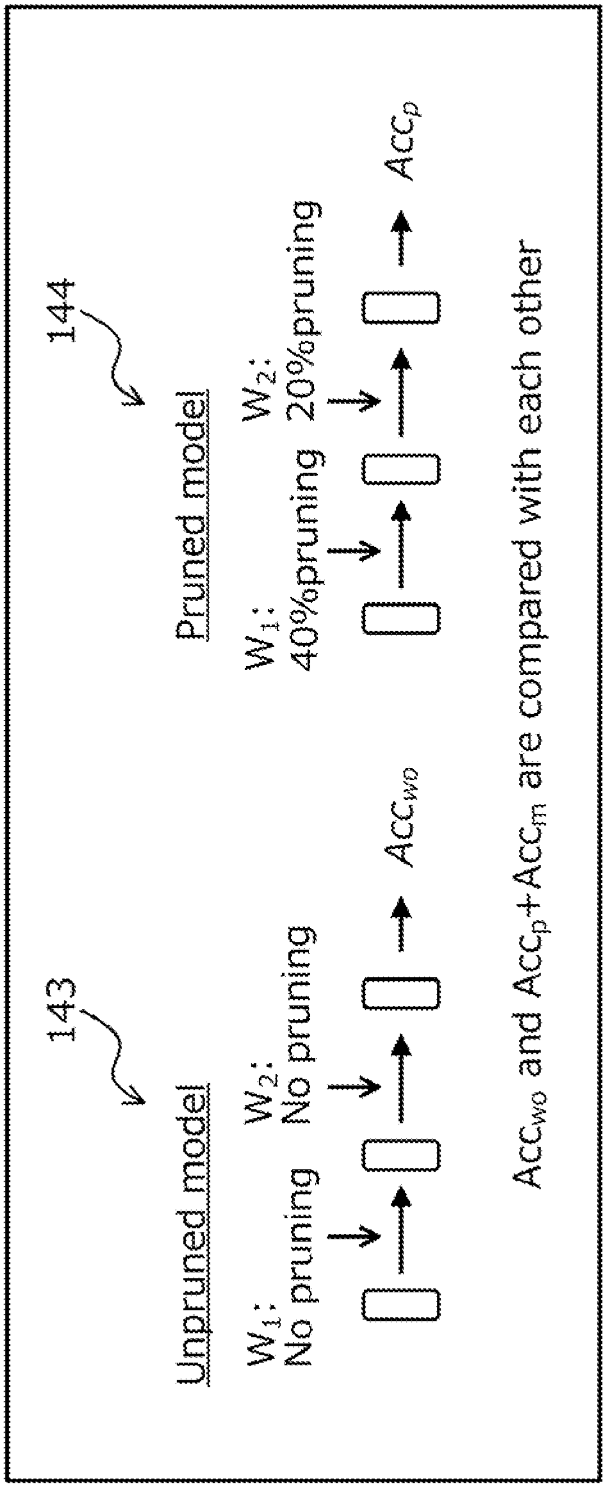
FIG. 6 is a diagram illustrating an example of calculating accuracy of models before and after pruning.

FIG. 6 is a diagram illustrating an example of calculating the accuracy of the model before and after the pruning. For example, the determining unit 14*b* calculates the accuracy $Acc_{wo}$ of the unpruned model (trained model 11*c*) for all layers ($W_1$, $W_2$, . . . ) (see arrow 143). The unpruned model may be regarded as a model that has been pruned at a pruning rate of 0% for each layer. The determining unit 14*b* calculates the accuracy $Acc_p$ of the model that has been pruned at the pruning rate ($W_1$=40%, $W_2$=20%, . . . ) calculated by (i) for each layer (see arrow 144).

If the sum $Acc_p+Acc_m$ of the accuracy is equal to or higher than the accuracy $Acc_{wo}$, the determining unit 14*b* determines to adopt the pruning rates determined in (i). For example, the determining unit 14*b* stores the pruning rates determined in (i) as the pruning rates 11*d* into the memory unit 11.

On the other hand, if the sum $Acc_p+Acc_m$ of the accuracy is lower than the accuracy $Acc_{wo}$, the determining unit 14*b* determines to discard the pruning rates determined in (i). For example, the determining unit 14*b* discards the pruning rates determined in (i) and determines to adopt the pruning rates 11*d* determined in the latest (ii) (or initial pruning rates 11*d*).

(iii) The calculating unit 14 (determining unit 14*b*) repeatedly applies (i) and (ii) multiple times to search for maximum pruning rates that can guarantee the accuracy.

Figure 7:
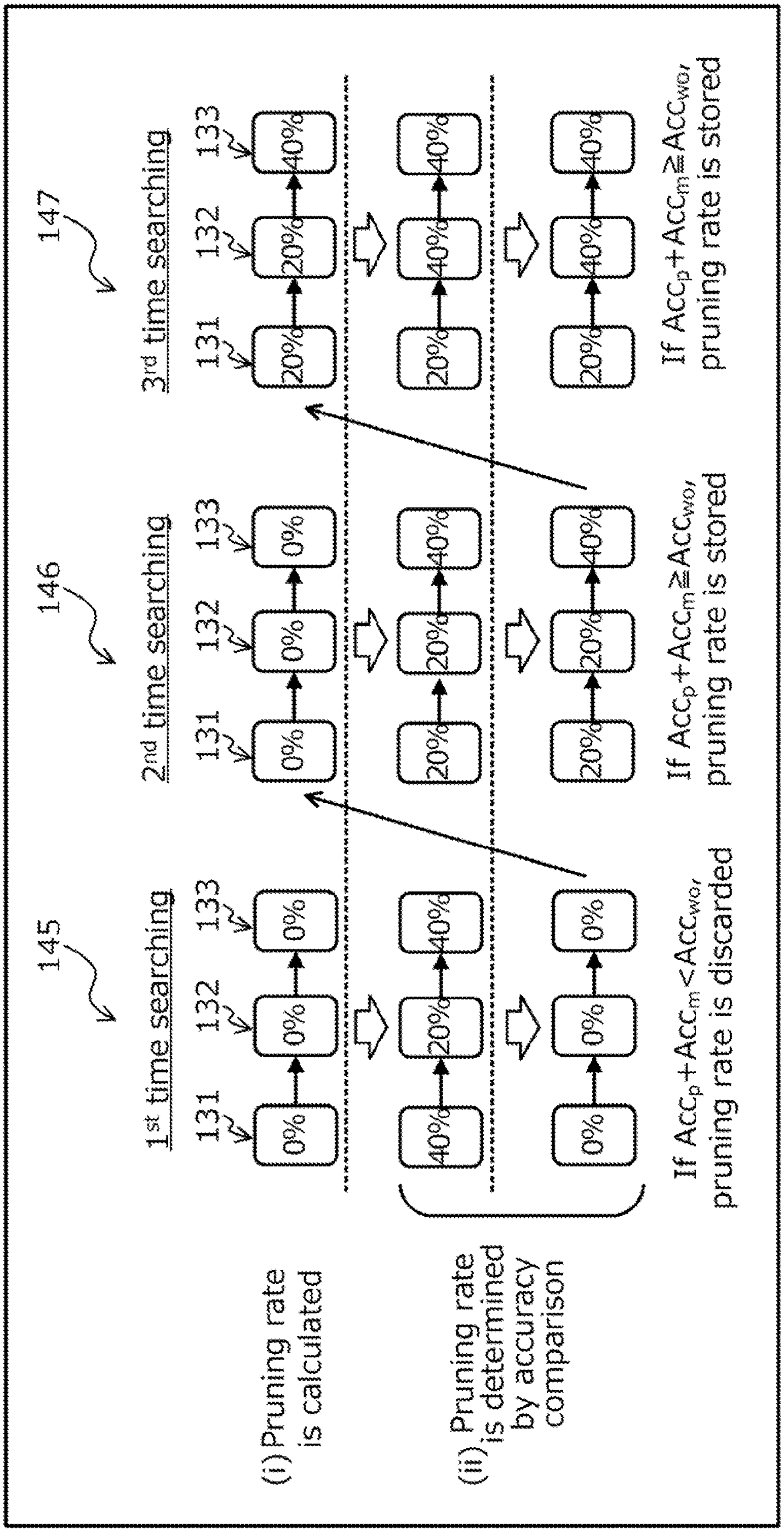
FIG. 7 is a diagram illustrating an example of a search for the pruning rates.

FIG. 7 is a diagram illustrating an example of a search for the pruning rates. The example of FIG. 7 illustrates a case where the calculating unit 14 uses the pruning rates for three layers (131 to 133) three times.

As illustrated in FIG. 7, in the first time searching (see reference numeral 145), in (i), the threshold calculating unit 14*a* is assumed to calculate the threshold $T_w$ and to determine that, based on the threshold $T_w$, the pruning rates for the layers 131 to 133 are to be "40%, 20%, 40%" from "0%, 0%, 0%" (initial values). For example, in (ii), if the determining unit 14*b* determines $Acc_p+Acc_m<Acc_{wo}$ in comparing the inference accuracy, the determining unit 14*b* discards the pruning rates determined in (i) and adopts "0%, 0%, 0%" which are the values before the determination.

In the second time searching (see reference numeral 146), in (i), the threshold calculating unit 14*a* is assumed to calculate (update) the threshold $T_w$ and to determine that, based on the updated threshold $T_w$, the pruning rates for the layers 131 to 133 are to be "20%, 20%, 40%" from "0%, 0%, 0%". For example, in (ii), if the determining unit 14*b* determines $Acc_p+Acc_m \geq Acc_{wo}$ in comparing the inference accuracy, the determining unit 14*b* adopts "20%, 20%, 40%" and stores them as the pruning rates 11*d* into the memory unit 11.

In the third time searching (see reference numeral 147), in (i), the threshold calculating unit 14*a* is assumed to calculate (update) the threshold $T_w$ and to determine that, based on the updated threshold $T_w$, the pruning rates for the layers 131 to 133 are to be "20%, 40%, 40%" from "20%, 20%, 40%". For example, in (ii), if the determining unit 14*b* determines $Acc_p+Acc_m \geq Acc_{wo}$ in comparing the inference accuracy, the determining unit 14*b* adopts "20%, 40%, 40%" and stores (updates) them as the pruning rates 11*d* into the memory unit 11.

The determining unit 14*b* may search for the pruning rates over a predetermined number of times, for example, a preset number of times.

As described above, the determining unit 14*b* determines the reduction ratios to be applied one to each of the multiple layers based on the inference accuracy of the trained model 11*c* and the inference accuracy of the reduced model after the machine learning, which is obtained by reducing each element of the multiple layers in the trained model 11*c* according to the reduction ratio candidates to be applied.

Figure 8:
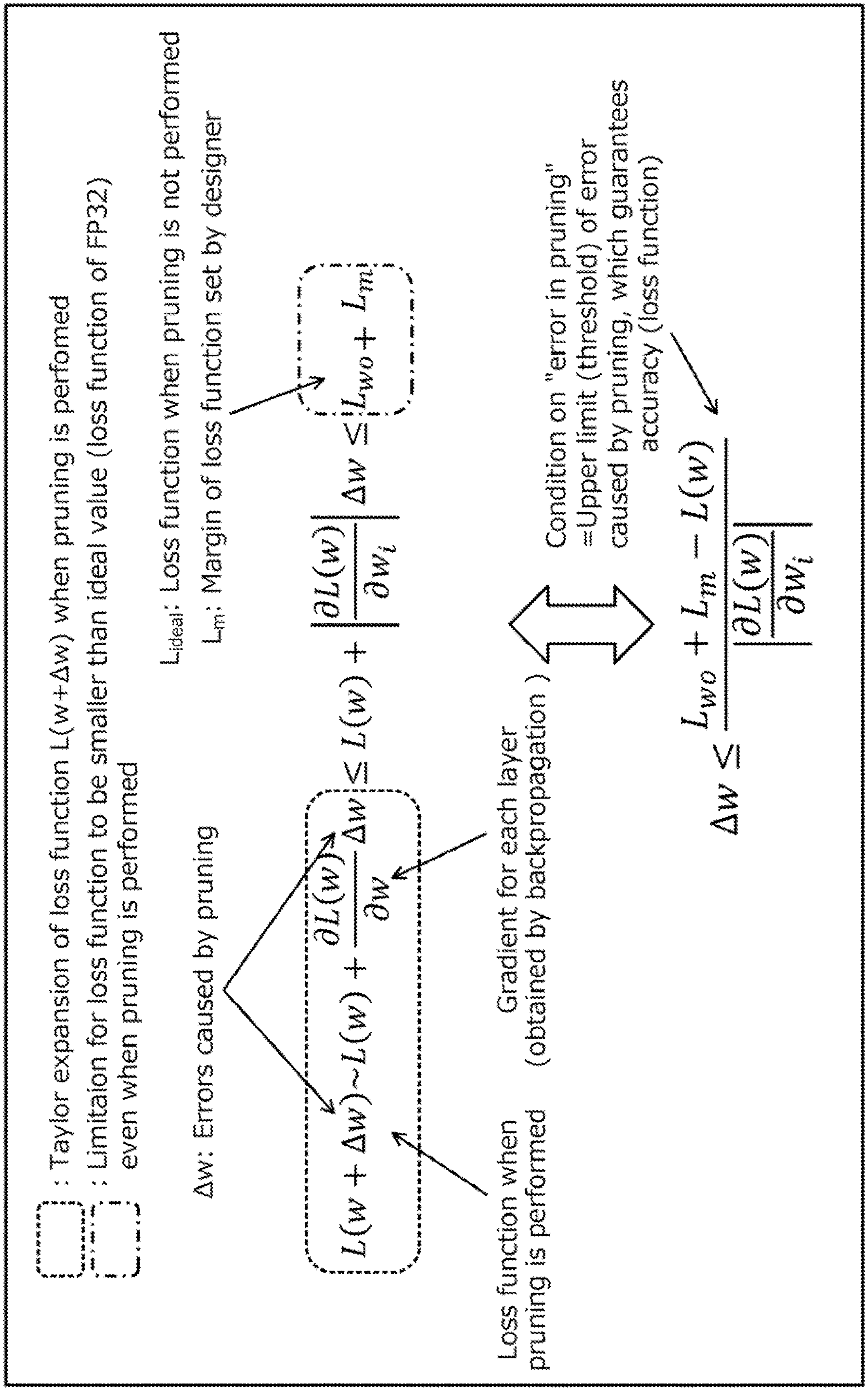
FIG. 8 is a diagram explaining an example of a method for deriving a threshold.
Figure 9:
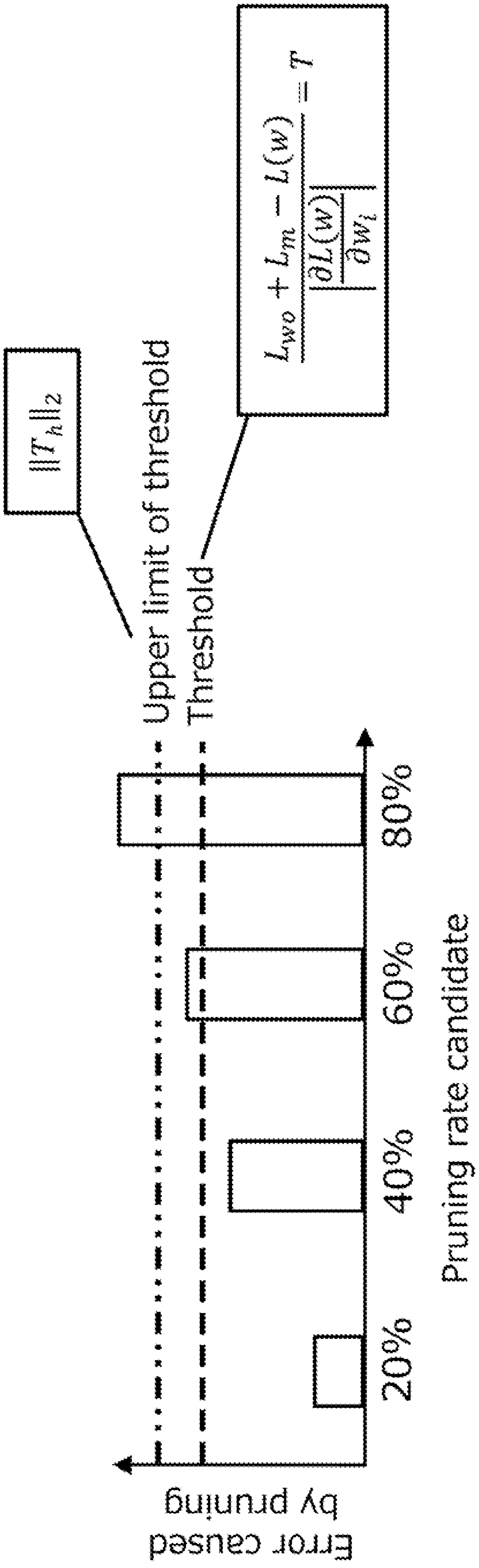
FIG. 9 is a diagram illustrating an example of the threshold and an upper limit of the threshold.

Next, description will be made in relation to a specific example of the pruning rate calculation process described above. FIG. 8 is a diagram explaining an example of a method for deriving a threshold, and FIG. 9 is a diagram illustrating an example of the threshold and the upper limit of the threshold.

The threshold calculating unit 14*a* performs first-order Taylor expansion on the loss function in the pruning to calculate the threshold of the pruning rate that can guarantee the accuracy for each layer. For example, assuming that: the error in the tensors for each layer, which error is generated by pruning, is Δw; the loss function in the pruning is L(w+Δw); the loss function of the model of the pruning target is L(w); and the loss function ($L_{ideal}$) without the pruning is $L_{wo}+L_m$, the threshold of the pruning rate that can guarantee the accuracy is calculated by the following equation (4). It should be noted that $L_{wo}$ is the loss function of the unpruned model, and $L_m$ is a margin of the loss function set by a designer.

[Equation 4]

$$L(w+\Delta w) \sim L(w) + \frac{\partial L(w)}{\partial w}\Delta w \leq L(w) + \left|\frac{\partial L(W)}{\partial w_i}\right|\Delta w \leq L_{wo} + L_m \quad (4)$$

The left side of the above equation (4) (see the dashed line box in FIG. 8) is the Taylor expansion of the loss function L(w+Δw) in the pruning, and includes a weight gradient "∂L(W)/∂w" of each layer of the pruning target. The gradient of each layer may be calculated by backpropagation. The right side of the above equation (4) (see the dash-dot line box in FIG. 8) is a limitation for the loss function to be smaller than an ideal value (for example, the loss function of FP32) even when pruning is performed.

As described above, the threshold calculating unit 14*a* calculates the thresholds T based on the values of the loss functions of the trained model 11*c* at the time of reducing elements of each of the multiple layers and the weight gradients of each of the multiple layers.

Rearranging the above equation (4) can derive, as expressed by the following equation (5), a condition of the "error in pruning", which satisfies the limitation for the loss function in the pruning to be smaller than the ideal loss function. In other words, it is possible to derive the upper limit (threshold) of the error caused by the pruning, which guarantees the accuracy (loss function). The threshold calculating unit 14*a* sets the right side of the following equation (5) to be the threshold T.

[Equation 5]

$$\Delta w \leq \frac{L_{wo} + L_m - L(w)}{\left|\frac{\partial L(W)}{\partial w_i}\right|} \quad (5)$$

As illustrated in FIG. 9, the threshold calculating unit 14*a* compares the threshold T set for each layer with the error in the L1 norm caused by the pruning. Then, the threshold calculating unit 14*a* determines to adopt the pruning rate candidate of the maximum value (40% in the example of FIG. 9) among the pruning rate candidates with errors smaller than the threshold T as the pruning rate resulted by (i).

As an example, in accordance with the following equation (6), the threshold calculating unit 14*a* may determine, for each layer of the pruning target, the pruning rate that causes a pruning error (left side) to be equal to or smaller than the threshold (right side). In the following equation (6), "$\|\Delta W\|_1$" is the L1 norm of the weight to be regarded as the pruning target and "n" is the number of elements of the weight of the layer in the pruning target.

[Equation 6]

$$\frac{\|\Delta W\|_1}{n} \leq \frac{L_{wo} + L_m - L(W)}{n} \sum_{i=1}^{n} \frac{1}{\left|\frac{\partial L(W)}{\partial w_i}\right|} \quad (6)$$

As illustrated in the above equation (6), the threshold T is to be a parameter derived by approximation. To prevent mistakes in determining the pruning rate due to an approximation error, an upper limit may be set for the threshold T (see FIG. 9). For example, the threshold calculating unit 14*a* may limit, based on a trust-region method, the magnitude of the threshold T by a "trust radius". The trust radius is an example of a threshold upper limit. As an example, the threshold calculating unit 14*a* may scale the thresholds T such that an L2 norm of the thresholds T of all layers become equal to or smaller than the trust radius. In the example of FIG. 9, $T_h$ represents a vector according to the threshold T of each layer and "$\|T_h\|_2$" represents the L2 norm of the thresholds T of all layers.

For example, in accordance with the comparison result of the accuracy in the process of (ii) by the determining unit 14*b*, the threshold calculating unit 14*a* may update, in addition to the pruning rates, the trust radius (e.g., by multiplying it by a constant factor or the like). The initial value of the trust radius may be set by, for example, a designer or the like.

As an example, if the sum $Acc_p$+$Acc_m$ of the accuracy is equal to or higher than the accuracy $Acc_{wo}$, the threshold calculating unit 14*a* may multiply the trust radius by a constant K ("K>1.0"), and if the sum $Acc_p$+$Acc_m$ of the accuracy is lower than the accuracy $Acc_{wo}$, the threshold calculating unit 14*a* may multiply the trust radius by a constant k ("0<k<1.0").

<1-3> Explanation According to Type of Pruning Target

Next, description will be made in relation to examples of a method for pruning and a method for calculating the pruning error according to the type of the pruning target. The type of the pruning target may be, for example, channel pruning, node pruning, weight pruning, etc. According to the type of the pruning target, the calculating unit 14 may determine the pruning target and the pruning error by using the weight corresponding to the pruning target.

<1-3-1> Example of Channel Pruning

Figure 10:
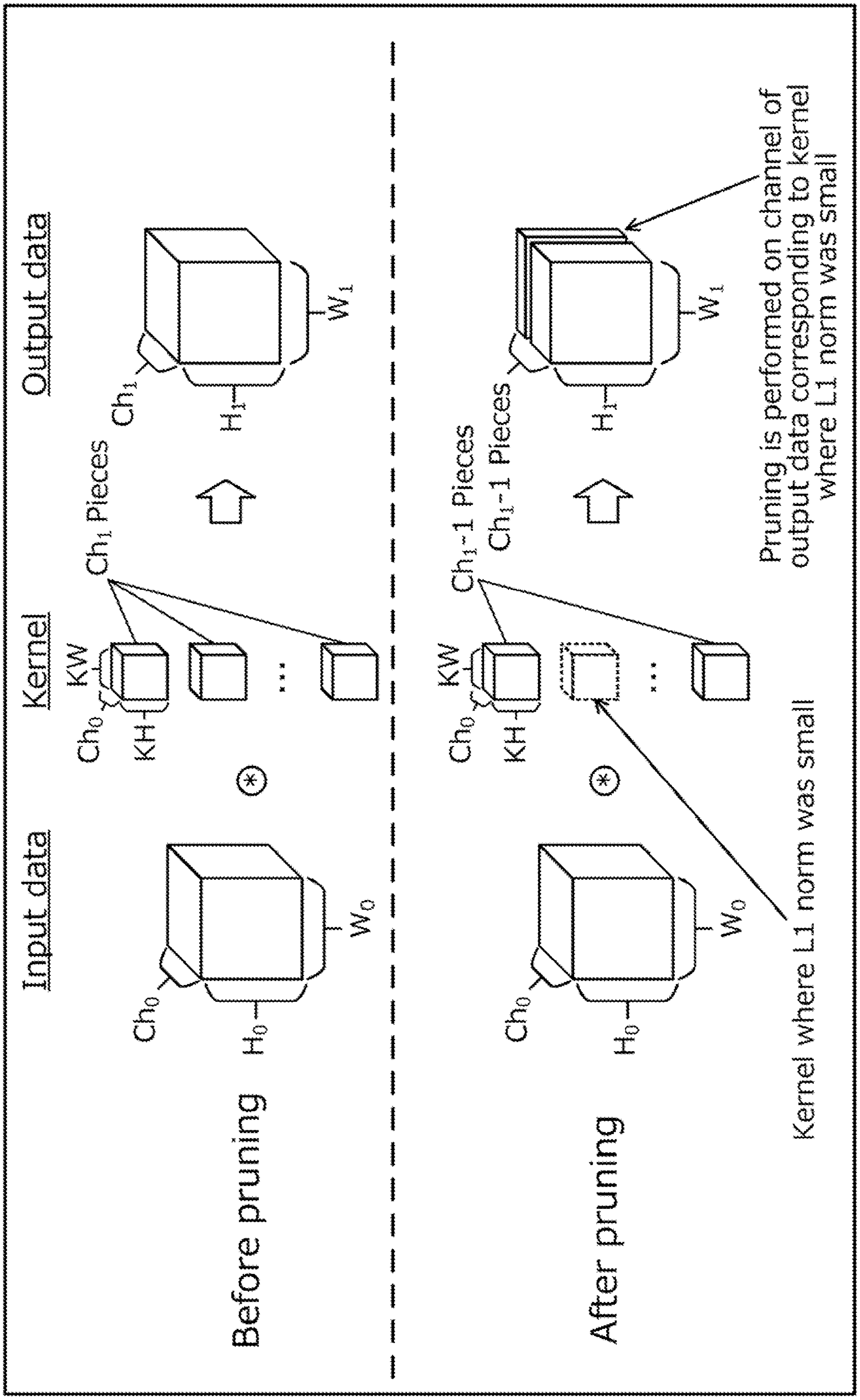
FIG. 10 is a diagram explaining an example of a method for determining a channel to be pruned.
Figure 11:
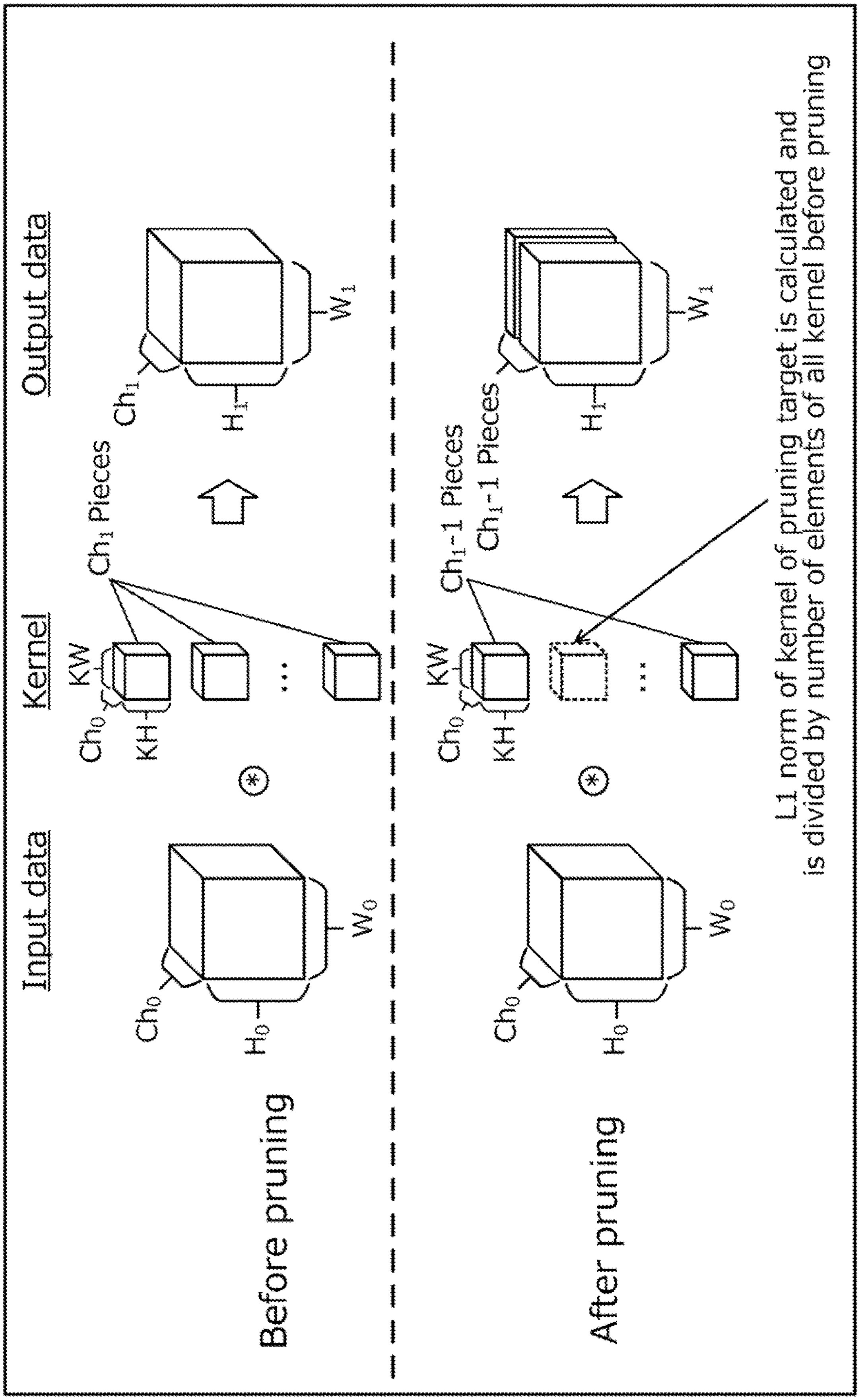
FIG. 11 is a diagram explaining an example of calculating a pruning error.

FIG. 10 is a diagram explaining an example of a method for determining a channel to be pruned and FIG. 11 is a diagram explaining an example of calculating the pruning error.

FIGS. 10 and 11 illustrate process flows of a convolution operation. Subscripted H and W indicate the sizes of input data, kernels, and output data, and subscripted Ch indicates the number of channels of the input data, the kernels, and the output data. Hereinafter, the same applies to the description of other type of pruning target.

Example of Method for Determining Channel to be Pruned

When the type of the pruning target is the channel, the calculating unit 14 calculates the L1 norm in units of kernels corresponding to the channels of the output data. For example, the calculating unit 14 calculates, as illustrated by "before pruning" in FIG. 10, the respective L1 norms for all of $Ch_1$ kernels before the pruning. As a result, $Ch_1$ L1 norms are calculated.

Next, as illustrated by "after pruning" in FIG. 10, the calculating unit 14 prunes the channel of the corresponding output data according to the set pruning rate in ascending order of the calculated L1 norms.

Example of Calculating Pruning Error

As illustrated in FIG. 11, the calculating unit 14 calculates the L1 norm of the kernel of the pruning target. The L1 norm of the kernel of the pruning target is the value obtained by subtracting the L1 norms of all kernels after pruning from the L1 norms of all kernels before pruning, that is, the difference in the L1 norms between before and after the pruning.

The calculating unit 14 may obtain the pruning error by dividing the calculated L1 norm by the number of elements of all kernels before the pruning.

<1-3-2> Example of Node Pruning

Figure 12:
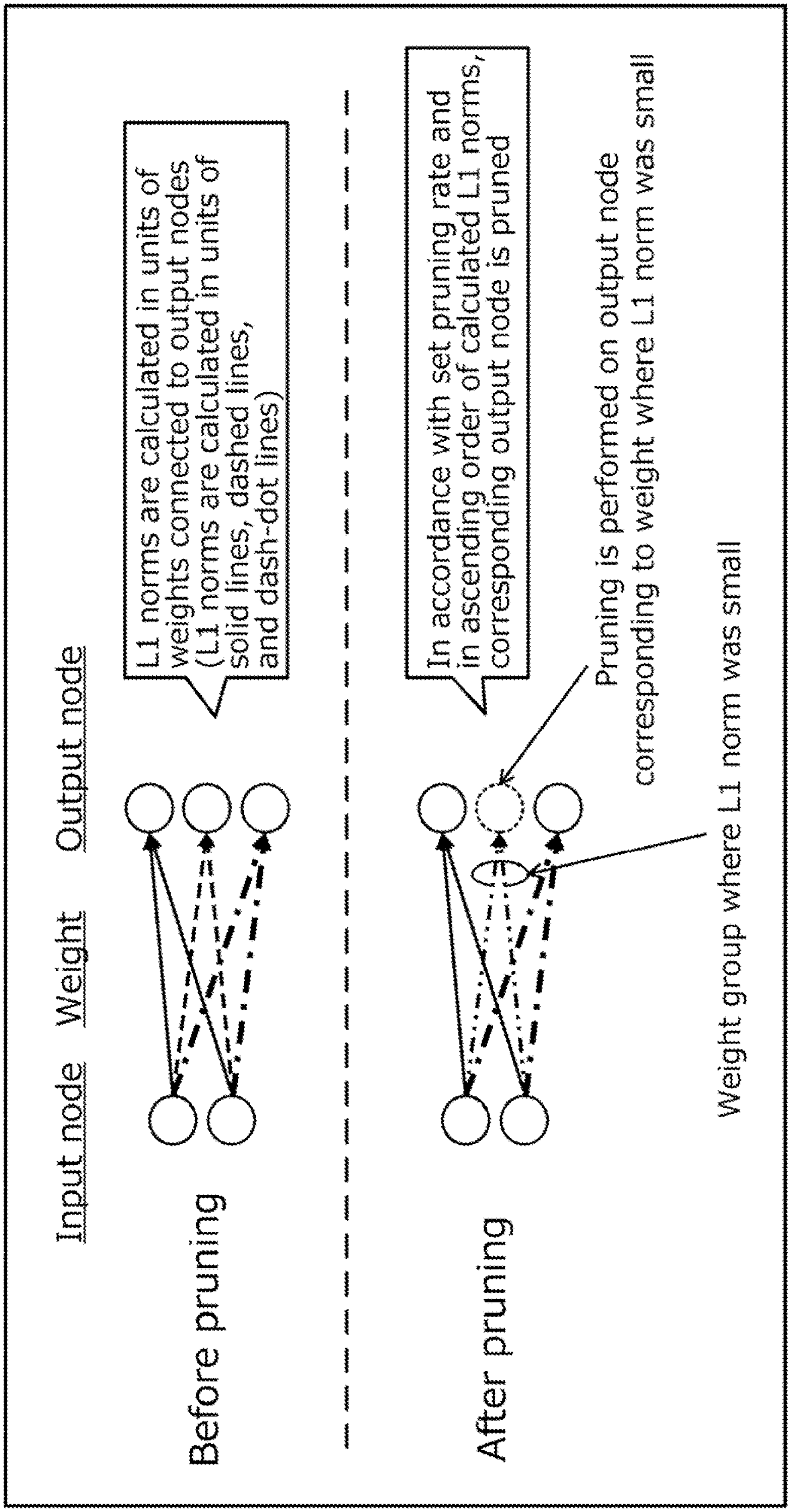
FIG. 12 is a diagram explaining an example of a method for determining a node to be pruned.
Figure 13:
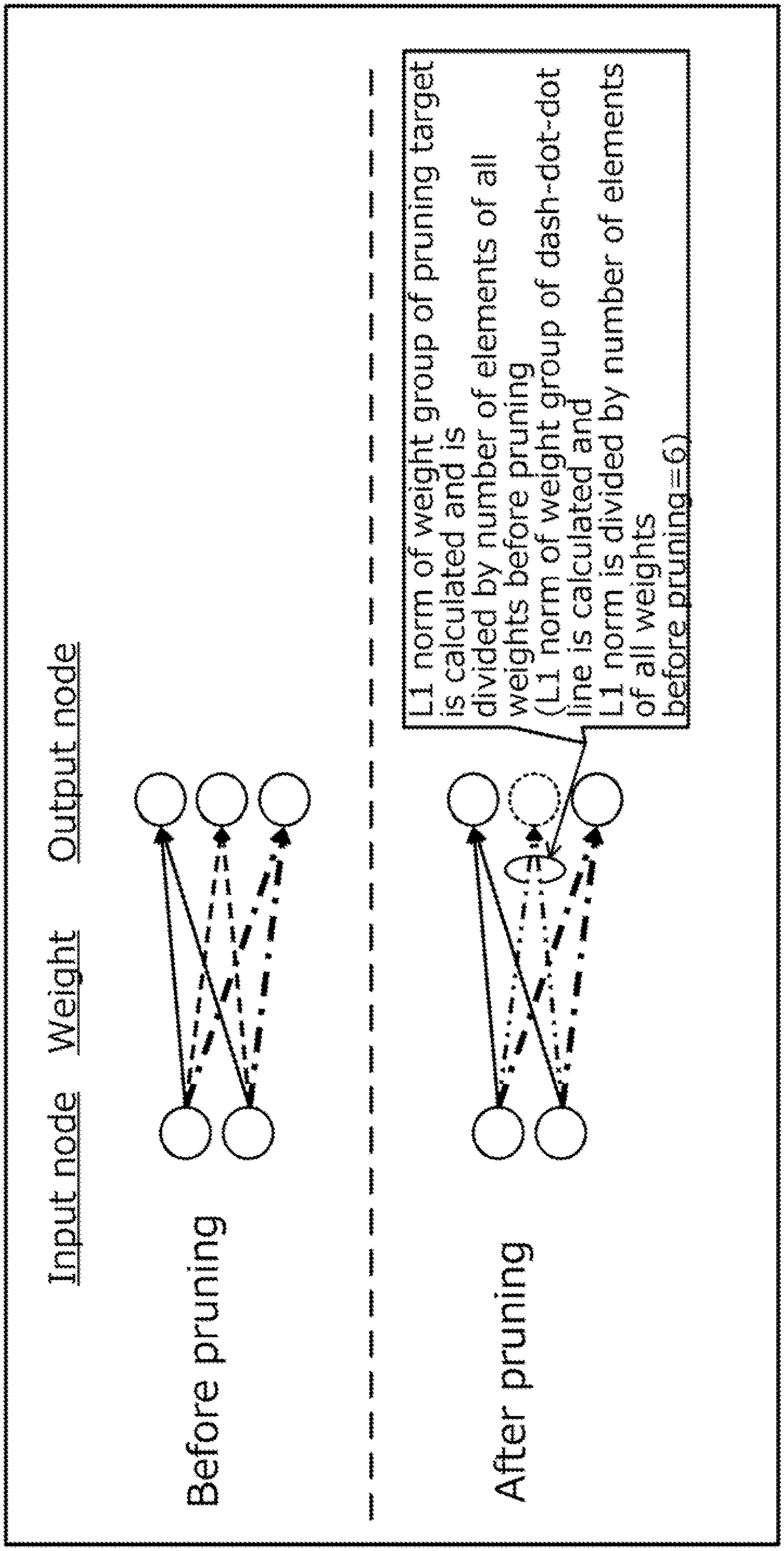
FIG. 13 is a diagram explaining an example of calculating a pruning error.

FIG. 12 is a diagram explaining an example of a method for determining the node to be pruned and FIG. 13 is a diagram explaining an example of calculating the pruning error.

Example of Method for Determining Node to be Pruned

When the type of the pruning target is the node, the calculating unit 14 calculates the L1 norm in units of weights connected to the output node. In the example of "before pruning" in FIG. 12, the calculating unit 14 calculates the L1 norm in each unit of solid lines, dashed lines, and dash-dot lines.

Next, as illustrated by "after pruning" in FIG. 12, the calculating unit 14 prunes the corresponding output node according to the set pruning rate in ascending order of the calculated L1 norms. For example, the calculating unit 14 determines that the output node corresponding to a weight group where the L1 norm was small is the node of the pruning target.

Example of Calculating Pruning Error

As illustrated in FIG. 13, the calculating unit 14 calculates the L1 norm of the weight group of the pruning target. The L1 norm of the weight group of the pruning target is obtained by subtracting the L1 norms of all weights after the pruning from the L1 norms of all weights before the pruning.

The calculating unit 14 may acquire the pruning error by dividing the calculated L1 norm by the number of elements of all weights before the pruning. In the example of "after pruning" in FIG. 13, the calculating unit 14 calculates the L1 norm of the weight group indicated by the dash-dot-dot line and divides the L1 norm by the number of elements (="6"; the number of lines) of all weights before the pruning.

<1-3-3> Example of Weight Pruning

Figure 14:
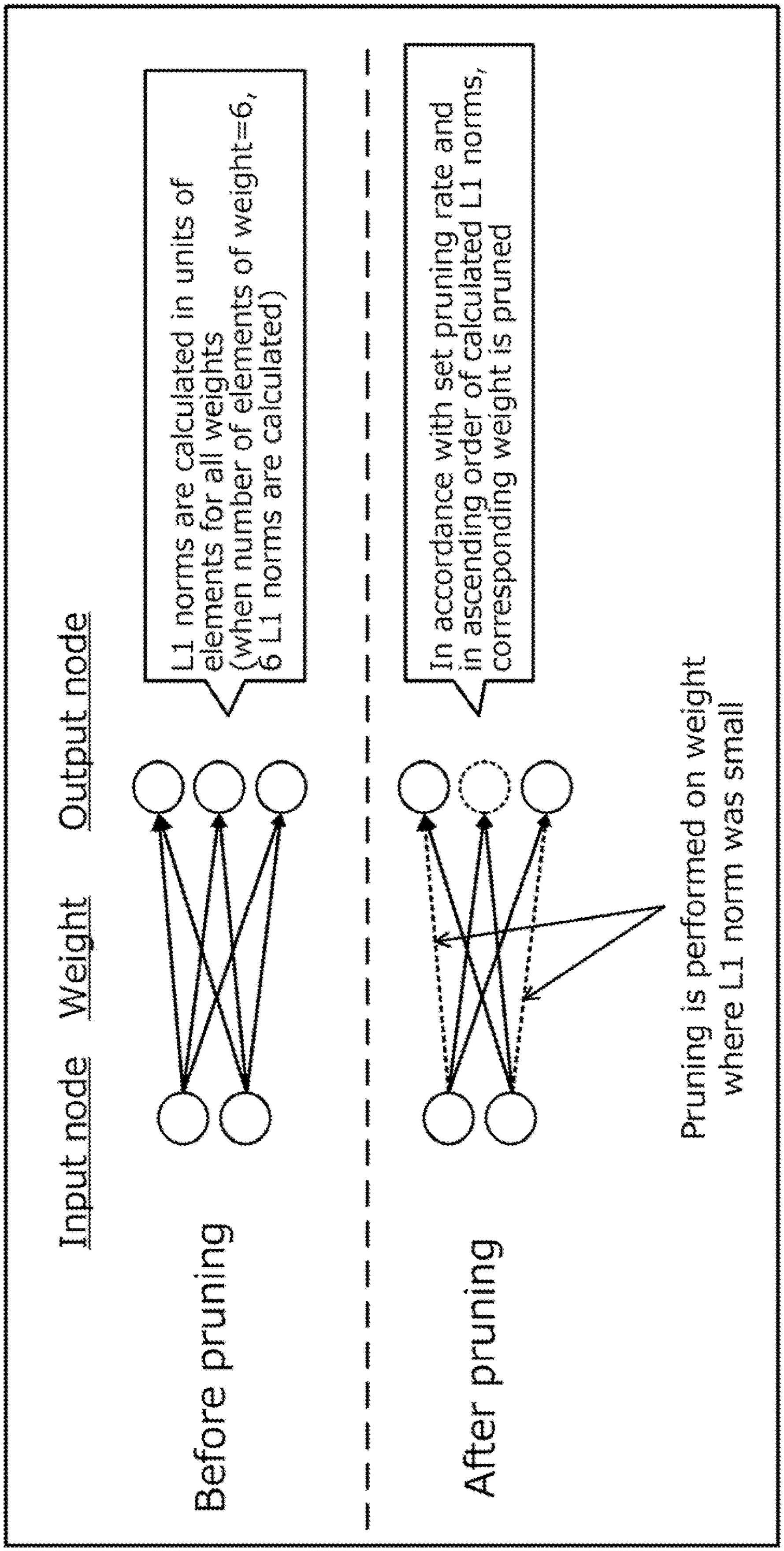
FIG. 14 is a diagram explaining an example of a method for determining a weight to be pruned.
Figure 15:
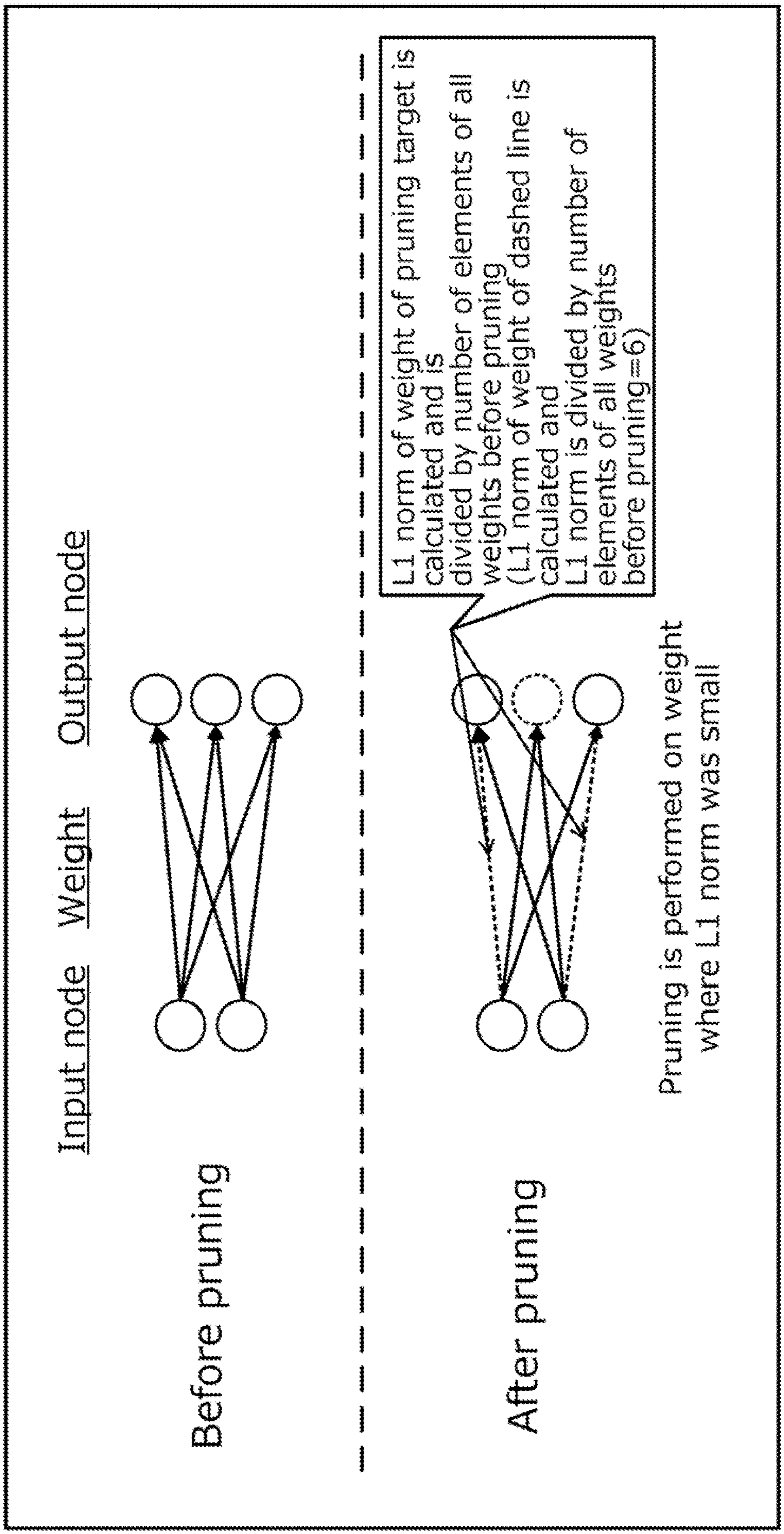
FIG. 15 is a diagram explaining an example of calculating a pruning error.

FIG. 14 is a diagram illustrating an example of a method for determining a weight to be pruned and FIG. 15 is a diagram illustrating an example of calculating the pruning error.

Example of Method for Determining Weight to be Pruned

When the type of the pruning target is the weight, the calculating unit 14 calculates the L1 norms for all of the weights in units of elements. In the example of "before pruning" in FIG. 14, since the number of elements of the weight is "6", the calculating unit 14 calculates "6" L1 norms.

Next, as illustrated by "after pruning" in FIG. 14, the calculating unit 14 prunes the corresponding weight according to the set pruning rate in ascending order of the calculated L1 norms. For example, the calculating unit 14 determines that the weight where L1 norm was small is the weight to be pruned.

Example of Calculating Pruning Error

As illustrated in FIG. 15, the calculating unit 14 calculates the L1 norm of the weight of the pruning target. The L1 norm of the weight of the pruning target is obtained by subtracting the L1 norms of all weights after the pruning from the L1 norms of all weights before the pruning.

The calculating unit 14 may acquire the pruning error by dividing the calculated L1 norm by the number of elements of all weights before the pruning. In the example of "after pruning" in FIG. 15, the calculating unit 14 calculates the L1 norm of the weight indicated by the dashed line and divides the L1 norm by the number of elements (="6"; the number of lines) of all weights before the pruning.

<1-4> Explanation of Pruning Process of NN Including Concat Unit

Figure 16:
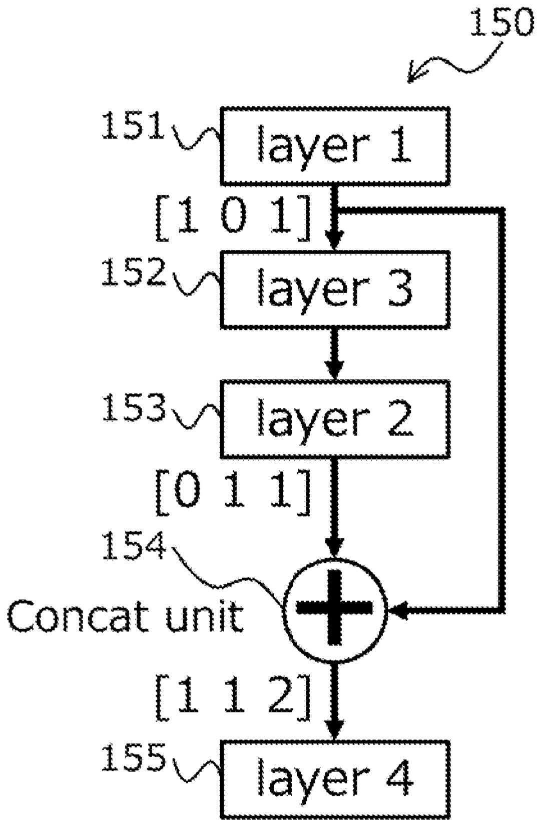
FIG. 16 is a diagram illustrating an example of an NN including a concat unit.
Figure 17:
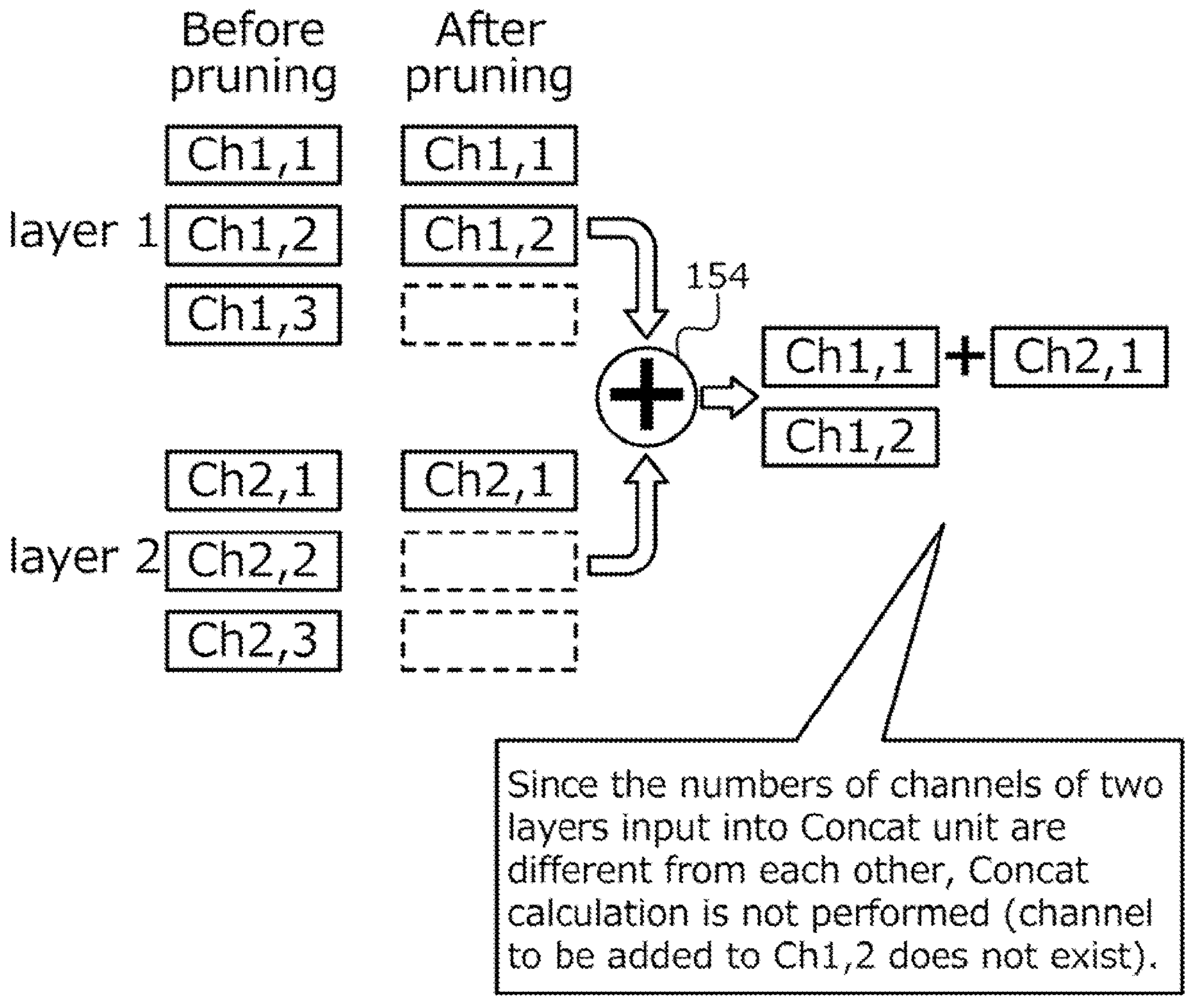
FIG. 17 is a diagram illustrating an example of tensors before and after a scheme according to the one embodiment is applied to the NN including the concat unit.

FIG. 16 is a diagram illustrating an example of an NN 150 including a concat unit 154 and FIG. 17 is a diagram illustrating tensors before and after a scheme according to the above-described one embodiment is applied to the NN 150 including the concat unit 154.

As illustrated in FIG. 16, the NN 150 includes layers 151-153 and 155 (respectively denoted by layers 1, 3, 2, and 4), and the concat unit 154. The concat unit 154 adds tensors from the layers 1 and 2, using these tensors as inputs, and outputs the result of the addition to the layer 4. The concat operation is an example of a calculating process that outputs a tensor serving as a result of a given calculation performed on a tensor from the layer 1 and a tensor from the layer 2. The following description assumes an example that two input layers input tensors into the concat unit 154, but the present embodiment is not limited to this. Alternatively, the number of input layers may be three or more. In other words, into the concat unit 154, a tensor from a preceding layer coupled to a stage preceding the concat unit 154 and one or more tensors from one or more layers shortcut-connected (shortcut-concatenated) to the concat unit 154 may be input.

For simplification, the following description assumes that an element of the pruning target is a channel and the layers 1 and 2 each output a one-dimensional tensor having three channels (i.e., the element number is "3"). As an alternative to a channel, the element may be a weight or a node.

In the example of FIG. 16, the concat unit 154 adds a tensor [101] output from the layer 1 and a tensor [011] output from the layer 2 for each channel, and outputs a tensor [112], which is the result of the addition, to the layer 4. Each column in a tensor corresponds to an element (e.g., channel) of a pruning target. Hereinafter, each column in a tensor is sometimes denoted as, for example, [Ch1,2], which means the channel 2 in the layer 1. The position of a channel in a layer can be specified (assigned) by an index.

Here, as a result of applying the above-described scheme of the one embodiment to the NN 150 illustrated in FIG. 16, the respective pruning rates of the layers 1 to 4 are determined individually, and then the layers 1 to 4 are pruned at the respective determined pruning rates.

For example, as shown in FIG. 17, it is assumed that a tensor [Ch1,3] among the tensors [Ch1,1], [Ch1,2], and [Ch1,3] outputted from the layer 1 is pruned, and the tensors [Ch2,2] and [Ch2,3] among the tensors [Ch2,1], [Ch2,2], and [Ch2,3] outputted from the layer 2 are pruned.

In this case, since the respective numbers of channels inputted from the layers 1 and 2, which mean the element numbers (sizes) of the dimension of the channels of the tensors, are different from each other for being "2" and "1", the concat unit 154 does not perform a concat operation. This is because, in the case of FIG. 17, a cannel to be added to [ch1,2] does not exist.

For example, as one of the solution to avoid such a situation where a concat operation cannot be performed, all the layers that output tensors that are to serve as inputs into a concat operation are uniformly excluded from targets of determining the pruning rates. However, in this situation, as the number of concat units 154 included in an NN increases, the pruning rate of the overall machine learning model of the NN lowers, so that the effect brought by compression (size reduction) of the data size of the machine learning model by means of pruning lowers.

For the above, the calculating unit 14 according to the one embodiment inserts a zero padding layer into an output side of every layer (hereinafter, sometimes referred to as "layer just before concat") that is to serve as an input into the concat unit 154 (which means to output tensors to the concat unit 154).

A zero padding layer is a layer for padding a predetermined element (for example, a channel) of a tensor with "0" (zero). Padding is an operation of increasing the size (for example, the number of channels) of a tensor by embedding a value such as zero in the tensor. The layer just before concat is an example of multiple first layers, and the zero padding layer is an example of multiple second layers.

For example, the calculating unit 14 may cause the element numbers (sizes) of the tensors of all the layers just before concat after undergoing pruning, which layers input the tensors into the same concat unit 154, to match by zero padding with the zero padding layer. The element number is exemplified by the number of dimensions of channels of the tensor. For example, the calculating unit 14 may specify, based on the provisionally-calculated pruning rate, the number of channels of each layer just before concat, and determine the number of channels that is to undergo zero padding according to the specified number of channels.

Figure 18:
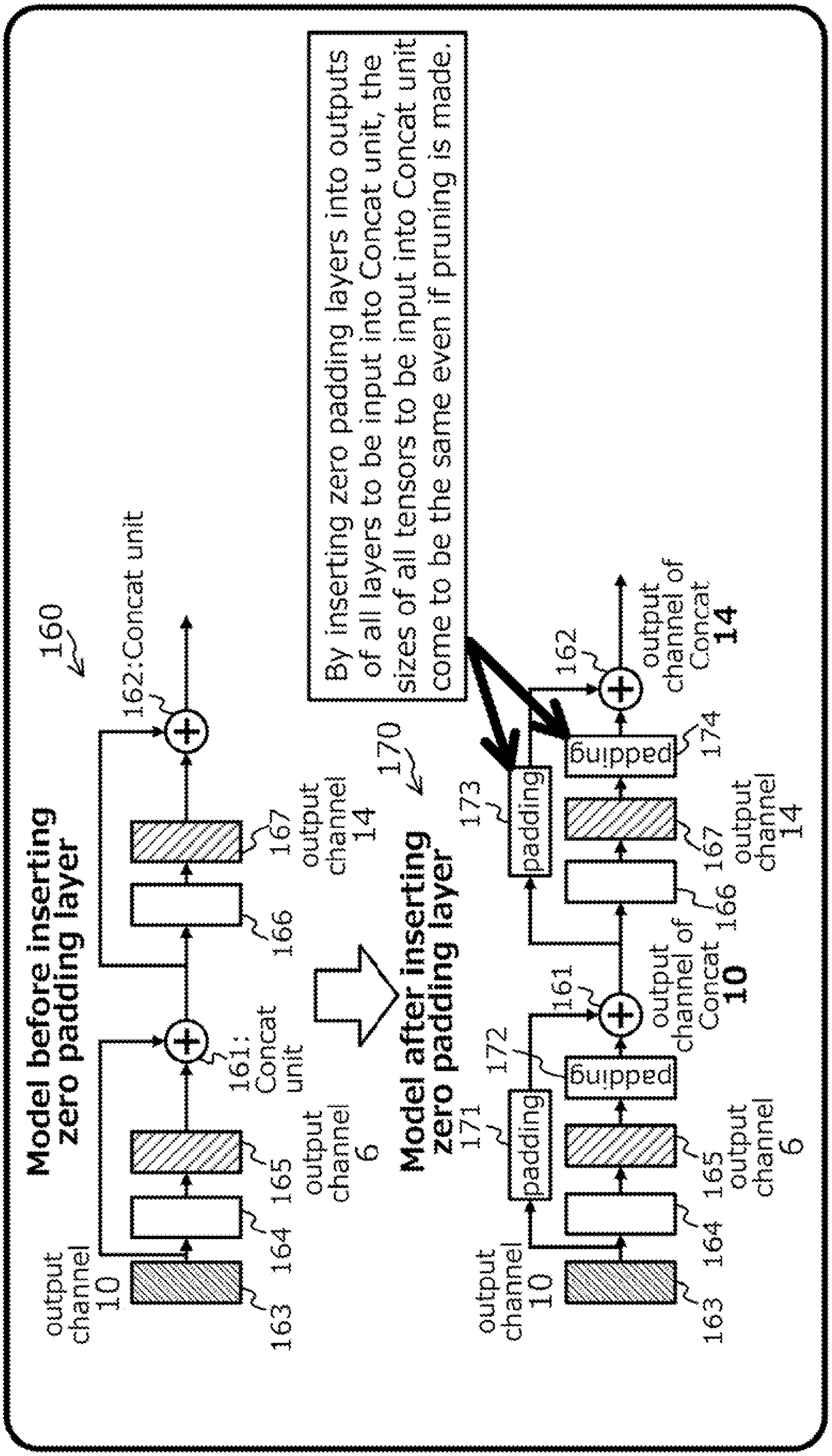
FIG. 18 is a diagram illustrating an example of inserting a zero padding layer into a model.

FIG. 18 is a diagram illustrating an example of inserting a zero padding layer into a model.

The process of inserting a zero padding layer may be carried out by using selected pruning rate candidates in cases where an NN of the pruning target includes the concat unit 154, and may prohibit the carrying out of the process in cases where the NN does not include the concat unit 154. For example, the calculating unit 14 may determine whether or not the NN includes the concat unit 154 with reference to configuration information (not illustrated) that defines the configuration of the NN which is exemplified by the configuration of each layer and connection relationship among the layers. The calculating unit 14 may specify each layer just before concat for each concat unit 154 on the basis of the configuration information.

FIG. 18 describes an example in which, in the above-described procedure (i), the calculating unit 14 calculates an L1 norm in units of kernel corresponding to a channel of output data and provisionally calculates the pruning rates by the L1 regularization learning (see FIG. 2) or the like. In the example of FIG. 17, if the provisionally-calculated pruning rates of the layers 1 and 2 are "33%" and "66%", respectively, the calculating unit 14 prunes one of the three channels of the layer 1 and two of the three channels of the layer 2.

As shown in FIG. 18, a model 160 before inserting of a zero padding layer includes concat units 161 and 162 and multiple layers 163-167. Into the concat unit 161, tensors outputted from the layers 163 and 165 are input, and into the concat unit 162, tensors outputted from the concat unit 161 and the layer 167 are input.

In the model 160, when the number of output channels of the layer 163 becomes "10" and the number of output channels of the layer 165 becomes "6" as a result of pruning, the numbers of input channels into the concat unit 161 do not match. Even under a state where a tensor having the number of output channels of "10" is output from the concat unit 161, if the number of output channels of the layer 167 is "14", the numbers of input channels into the concat unit 162 do not match.

As a solution to the above, as shown in model 170, the calculating unit 14 inserts (arranges) zero padding layers 171-174 into the output sides of the layers 163 and 165, the concat unit 162, and the layer 167, which are the layers just before concat. Then, the calculating unit 14 performs zero padding for each concat unit such that the numbers of channels of the tensors inputted to the respective concat units 161 and 162 come to be the same as each other.

For example, the calculating unit 14 performs zero padding with four channels on the output tensor of the layer 165 in the zero padding layer 172 such that the numbers of output channels of all the layers just before concat in the concat unit 161 coincide at the number "10", which is the largest value on the layer 163 side. This makes the concat unit 161 possible to output the tensor serving as a result of a concat operation having the number of output channels of "10" by using the tensor having the number of input channels of "10".

As another example, the calculating unit 14 performs zero padding with four channels on the output tensor of the layer 161 in the zero padding layer 173 such that the numbers of output channels of all the layers just before concat in the concat unit 162 coincide at the number "14", which is the largest value on the layer 167 side. This makes the concat unit 162 possible to output the tensor serving as a result of a concat calculation having the number of output channels of "14" by using the tensor having the number of input channels of "14.

FIG. 19 to FIG. 24 are diagrams illustrating an example of zero padding on layers just before concat of the concat unit 154.

Figure 19:
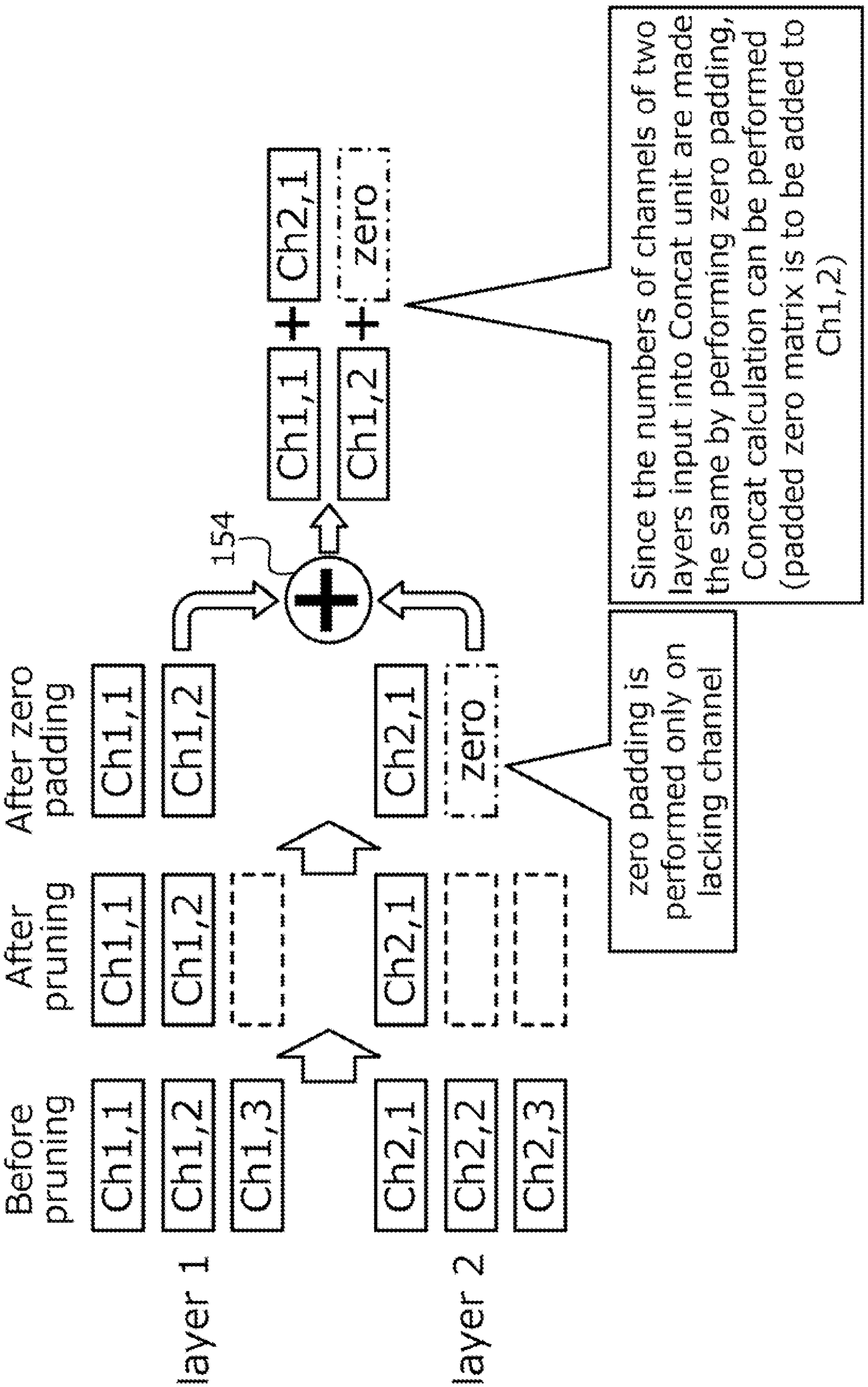
FIG. 19 is a diagram illustrating an example of zero padding on layers just before concat of a concat unit.

As illustrated in FIG. 19, the calculating unit 14 compares the respective numbers of channels after pruning of the layers 1 and 2, which are the layers just before concat, and acquires the largest value ("2" of the layer 1) of the number of channels. Then, the calculating unit 14 performs zero padding on the zero padding layer corresponding to the layer 2 having an insufficient number "1" of channels with the shortage number ("2−1=1") of channels. Thereby, the concat unit 154 can make the zero-matrix added by the padding to be the one added to [Ch1, 2].

Figure 20:
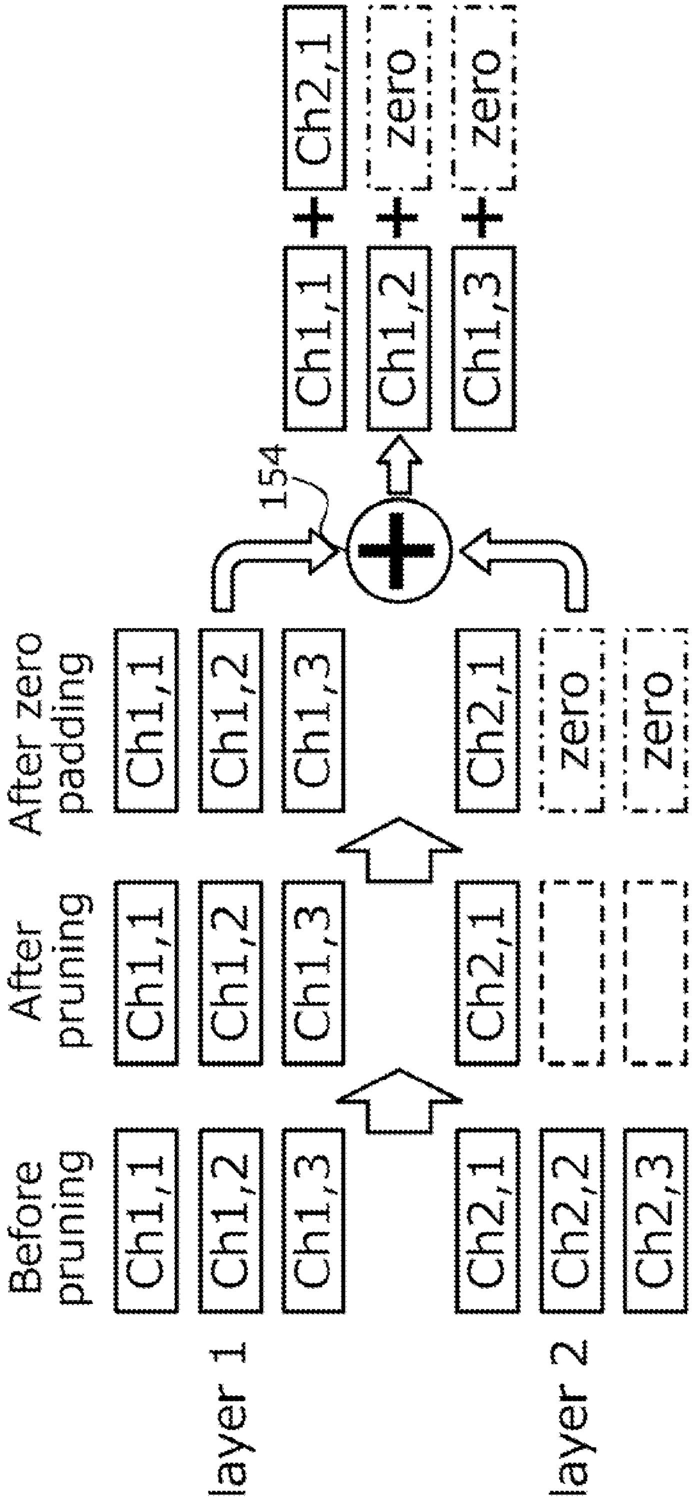
FIG. 20 is a diagram illustrating an example of zero padding on layers just before concat of a concat unit.

The calculating unit 14 may determine the number of channels lacking to reach the largest number (i.e., the shortage number of channels) to be the channel number to be subjected to zero padding. For example, as shown in FIG. 20, when the numbers of channels of the layers 1 and 2 after the pruning is "3" and "1", respectively, the calculating unit 14 may add two zero matrices corresponding to the number "2" of channels to the layer 2.

As described above, since there is a possibility that one or more elements in each layer just before concat are reduced in accordance with the respective reduction ratios of the layers just before concat, the numbers (sizes) of elements are different among the layers just before concat. To solve this inconvenience, the calculating unit 14 performs padding on each of the zero padding layers 17 with one or more zero matrices so that the respective sizes of the multiple tensors inputted to the concat unit 154 from the layers just before concat all come to be a first number. The first number is the number (size) of elements of the tensor of the layers just before concat.

The concat unit 154 can allow mismatches in element positions, for example, indices of channels, in a concat operation. For this reason, the calculating unit 14 may or may not consider matching of the indices of the channel to be inputted into the concat unit 154 due to zero padding. For example, when not considering the matching of the indices or when considering the matching of the indices, the calculating unit 14 may change the number (the first number) at which the numbers of elements of the tensor among the layers just before concat coincide due to the zero padding.

When not Considering Matching of the Indices

Figure 21:
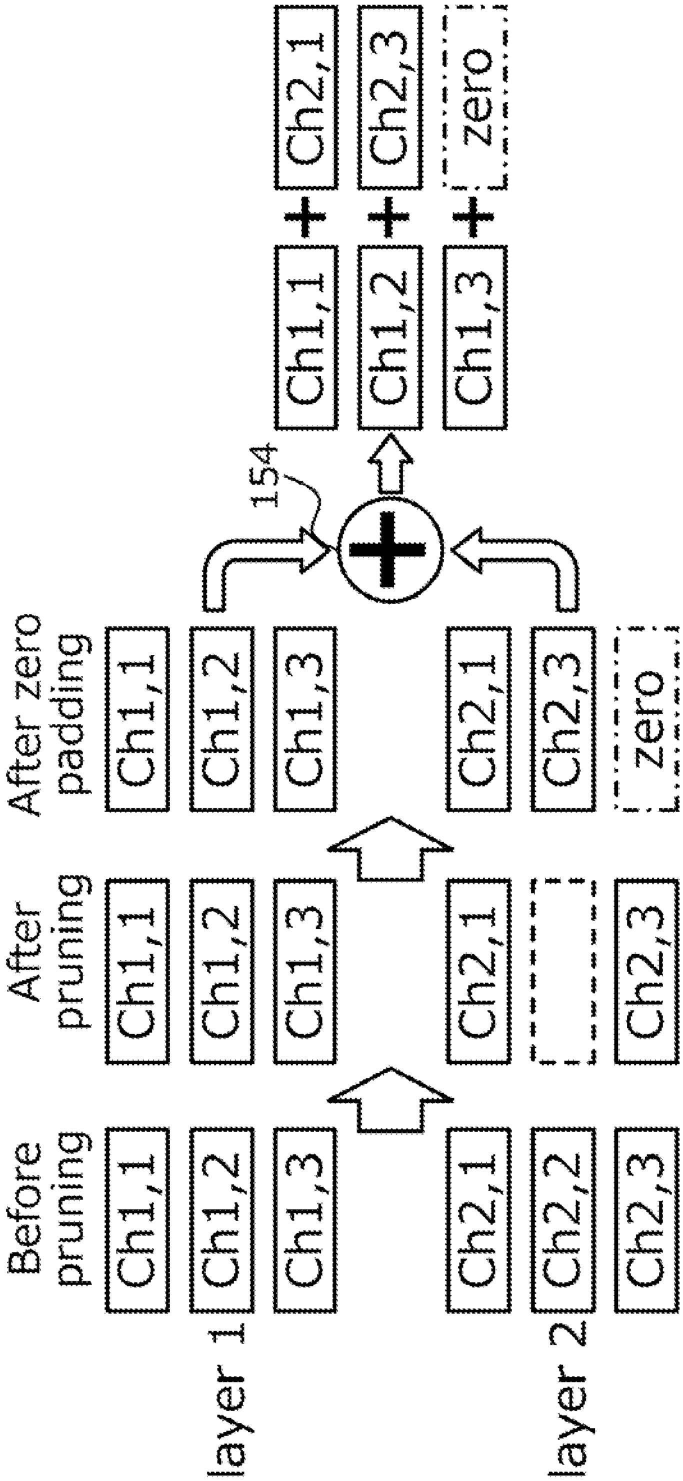
FIG. 21 is a diagram illustrating an example of zero padding on layers just before concat of a concat unit.

As illustrated in FIG. 21, when [Ch2,2] of the layer 2 is pruned, the calculating unit 14 may insert a zero matrix such that the tensors are arranged in the order of indices, i.e., [Ch2,1], [Ch2,3], and [zero]. In this case, the calculating unit 14 performs padding on the layer 1 without a zero matrix, and performs padding on the layer 2 with one zero matrix. The notation [zero] indicates a zero matrix. In the concat unit 154, concat operations of [Ch1,1]+[Ch2,1], [Ch1,2]+[Ch2,3], and [Ch1,3]+[zero] are performed.

Figure 22:
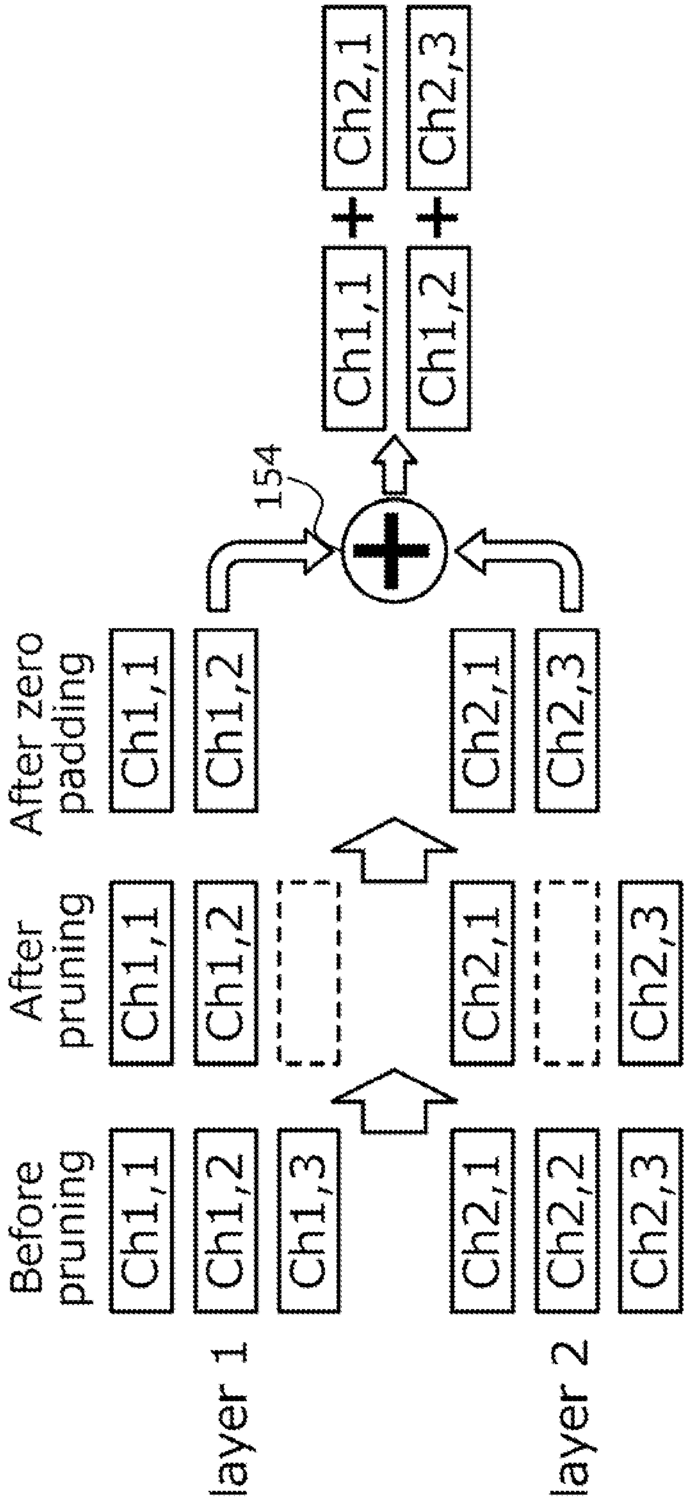
FIG. 22 is a diagram illustrating an example of zero padding on layers just before concat of a concat unit.

As another example illustrated in FIG. 22, when [Ch1,3] of the layer 1 and [Ch2,2] of the layer 2 are pruned, the indices of the channels do not match, but the both of the layers have the number of the channels of the largest value "2". In this case, the calculating unit 14 may suppress the zero padding. In other words, it can be said that the calculating unit 14 performs padding on each of the layer 1 and the layer 2 without a zero matrix. In the concat unit 154, concat operations of [Ch1,1]+[Ch2,1] and [Ch1,2]+[Ch2,3] are performed.

As described above, if not considering matching of the indices, the calculating unit 14 uses, as the first number, the largest number of elements among the multiple tensors outputted from the multiple layers just before concat after the element reduction. The largest number of elements is three in the example of FIG. 21 and two in the example of FIG. 22.

In addition, the calculating unit 14 may suppress the execution of zero padding on each of one or more second layers associated with the one or more first layers each in which the number of elements of the tensor to be outputted is the first number among the layers just before concat after the element reduction. In the example of FIG. 22, since both the layer 1 and the layer 2 have the largest number (first number) of channels being "two", the calculating unit 14 suppresses zero padding on each of the layer 1 and the layer 2.

When Matching the Indices

Figure 23:
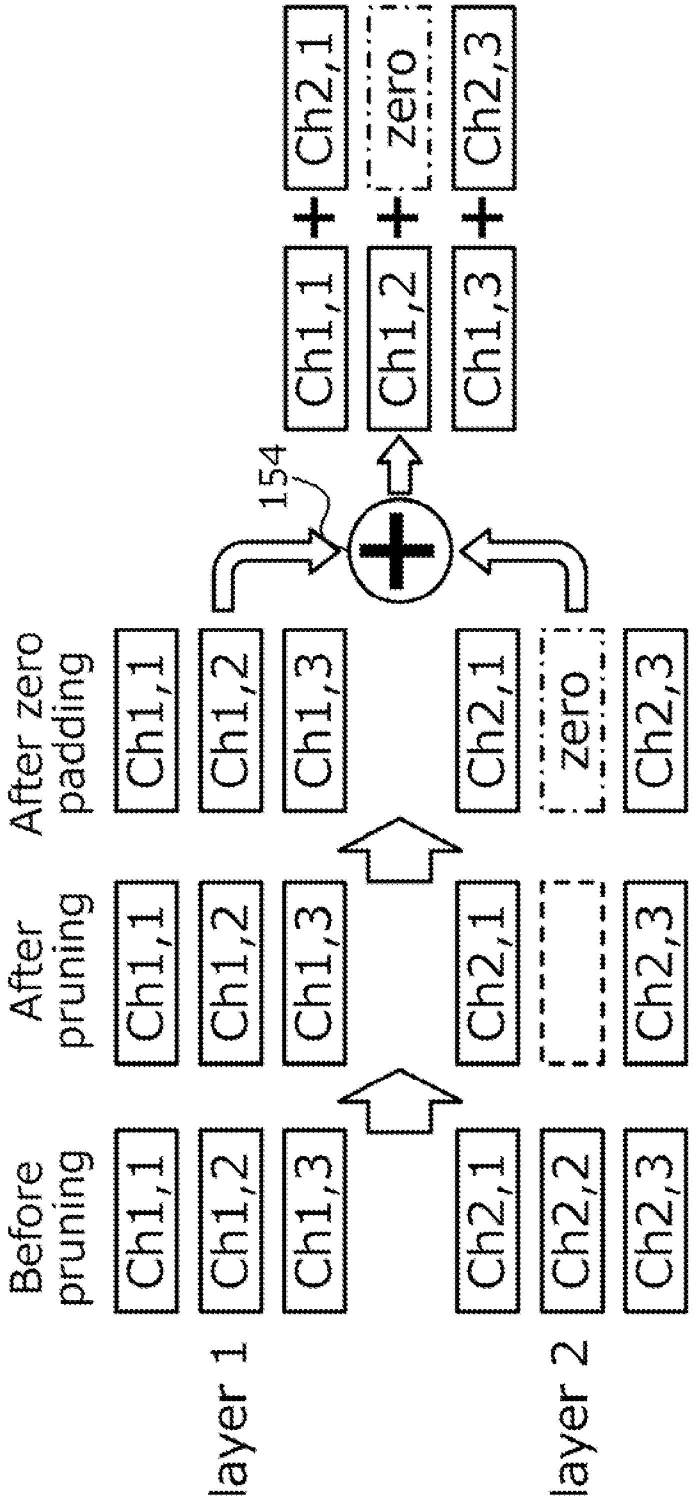
FIG. 23 is a diagram illustrating an example of zero padding on layers just before concat of a concat unit.

As illustrated in FIG. 23, when [Ch2,2] of the layer 2 is pruned, the calculating unit 14 may insert a zero matrix at the position of the pruned [Ch2,2] unlike the example in FIG. 21. In this case, the calculating unit 14 performs padding on the layer 1 without a zero matrix, and performs padding on the layer 2 with a zero matrix. In the concat unit 154, concat operations of [Ch1,1]+[Ch2,1], [Ch1,2]+[zero], and [Ch1,3]+[Ch2,3] are performed.

Figure 24:
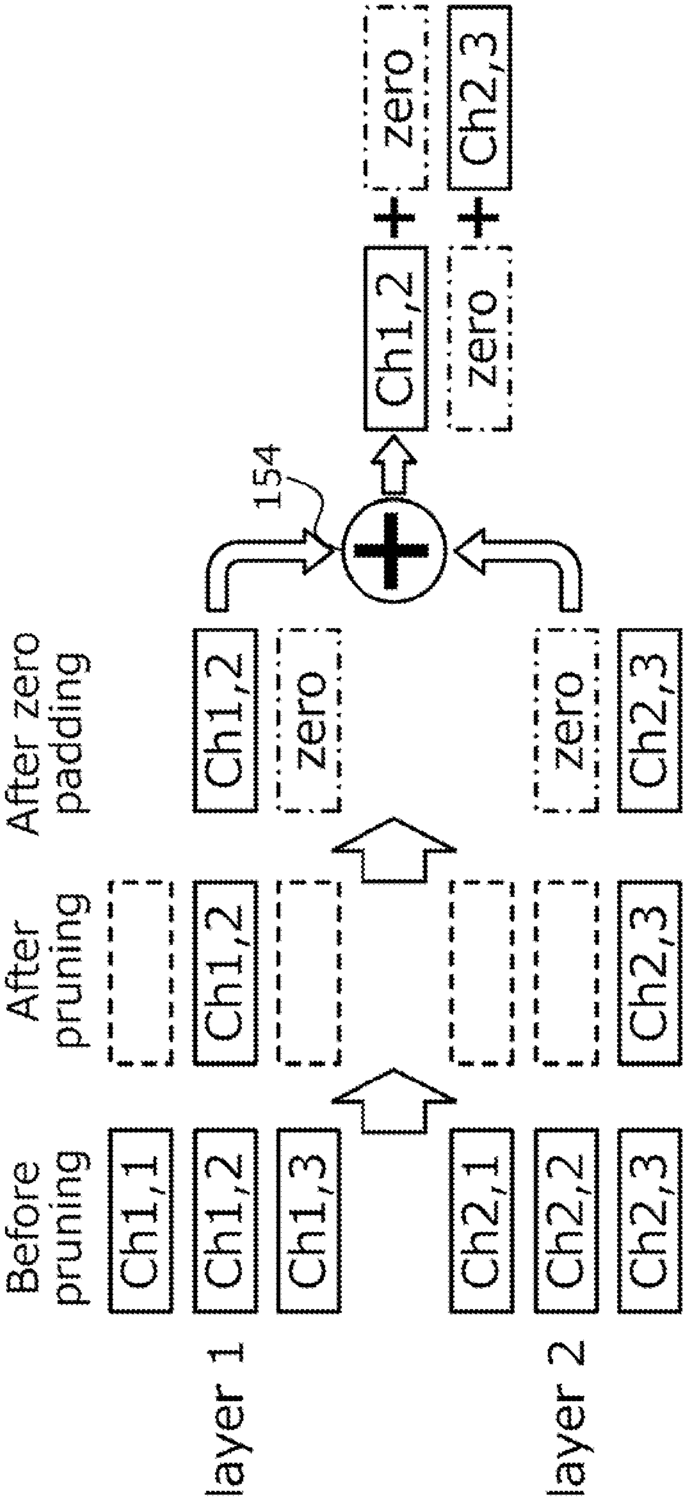
FIG. 24 is a diagram illustrating an example of zero padding on layers just before concat of a concat unit.

As another example illustrated in FIG. 24, when [Ch1,1] and [Ch1,3] of the layer 1 and [Ch2,1] and [Ch2,2] of the layer 2 are pruned, the calculating unit 14 may insert a zero matrix at each of the positions of pruned [Ch1,3] of the layer 1 and pruned [Ch2,2] of the layer 2. At this time, the calculating unit 14 may exclude, from the target of the zero padding, elements ([Ch1,1] of the layer 1 and [Ch2,1] of the layer 2) from which the common index (1) to all the layers of the layers 1 and 2 is deleted.

In the case of the example of FIG. 24, it can be said that the calculating unit 14 performs padding on each of the layer 1 and the layer 2 with a zero matrix. In the concat unit 154, concat operations of [Ch1,2]+[zero] and [zero]+[Ch2,3] are performed.

As described above, when matching the indices, the calculating unit 14 uses, as the first number, the number obtained by subtracting the number of elements of the first index common to the layers just before concat among the elements to be deleted in the layers just before concat from the number (initial value) of elements when the elements are not reduced in the multiple layers just before concat. For example, the number (initial value) of elements is common to the layers just before concat, and is three in both of the examples of FIG. 23 and FIG. 24. Among the elements to be deleted in the layers just before concat, the numbers of elements of the first index common to the layers just before concat are zero in the example of FIG. 23 and one (index 1) in the example of FIG. 24. Therefore, the first number is three in the example of FIG. 23 and two in the example of FIG. 24.

Then, in cases where the second index is not to be deleted in at least one third layer among multiple layers just before concat, the calculating unit 14 inserts a zero matrix into a second index of a fourth layer of the multiple layers just before concat except for the third layer.

In the example of FIG. 23, the combination of the third layer, the second index, and the fourth layer is the layer 1, index (2), and the layer 2. In the example of FIG. 24, the combinations of the third layer, the second index, and the fourth layer are a combination of the layer 1, the index (2), and the layer 2 and a combination of the layer 2, the index (3), and the layer 1.

Thereby, the calculating unit 14 can input the tensors having matching indices into concat unit 154 while reducing the number of elements of the layer just before concat to a feasible range.

As the above, the zero padding process makes each concat unit 154 possible to match the numbers (sizes) of elements of tensors inputted from multiple layers just before concat. Therefore, also a layer just before concat can be pruned, using provisionally calculated pruning rate candidates, so that the compression ratio of the data size of the machine learning model including the concat unit 154 can be improved.

Note that the process described by referring to FIGS. 18 to 24 may be part of the processing of (i) by the threshold calculating unit 14*a*, or may be executed by the threshold calculating unit 14*a*.

The process of the calculating unit 14 after executing the process described with reference to FIGS. 18 to 24 is the same as the process of (ii) and (iii).

The zero padding process described above is not limited to implementation when the element is a channel, and may alternatively be implemented when the element is either one of a weight and a node, or both.

FIG. 25 is a diagram illustrating an example of accuracy before and after pruning of an NN and a compression ratio of a data size with or without a zero padding process. In FIG. 25, a case where an input layer into concat unit 154 is not pruned means a case where a zero padding process is not applied and a layer just before concat of the concat unit 154 is excluded from a target for pruning.

As illustrated in FIG. 25, when the zero padding process is applied, the compression ratio of the data size of the down-sized model 11*e* can be improved in any models of Res32, Res56, and Res110 as compared with the case where the input layer into the concat unit 154 is not pruned. In addition, it is possible to suppress the accuracy from being greatly deteriorated.

FIG. 26 is a diagram illustrating an example of the number of output channels of each layer of an NN with or without a zero padding process. FIG. 26 assumes an example in which the models are cifar10 and resnet32. In FIG. 26, a layer (in bold) surrounded by a broken line is a layer just before concat to be inputted into the concat unit 154. "After pruning (without applying)" indicates a case where the input layer into the concat unit 154 is not pruned, and "after pruning (with applying)" indicates a case where the zero padding process is applied.

As illustrated in FIG. 26, when the zero padding process is applied, the number of output channels from the layer just before concat is reduced as compared with the case where the input layer into the concat unit 154 is not pruned. That is, it can be understood that the application of the zero padding process appropriately prunes the layer just before concat.

<1-5> Operation Example

Figure 27:
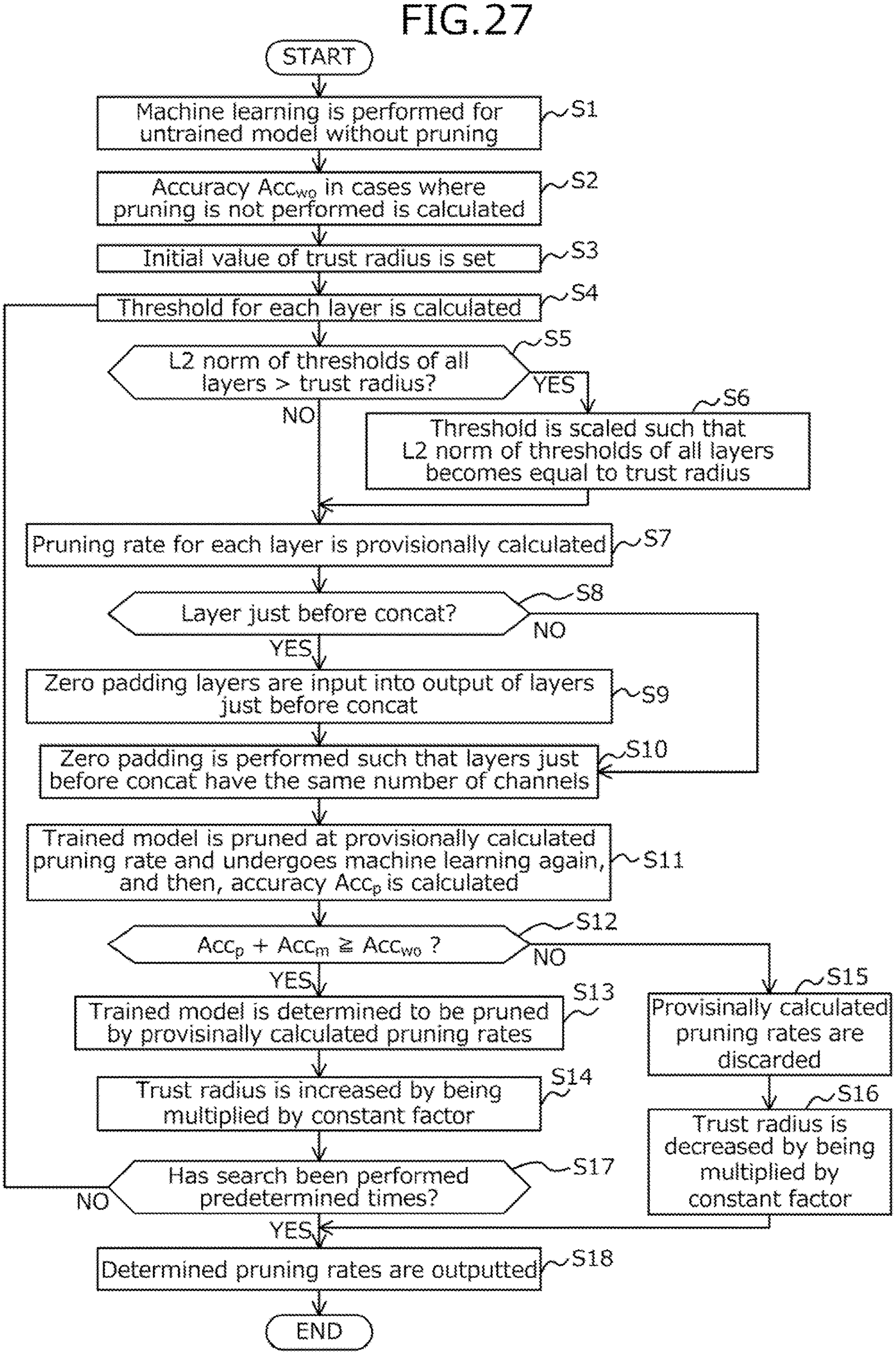
FIG. 27 is a flowchart for explaining an operation example of processes by the server according to the one embodiment.

Next, with reference to FIG. 27, an operation example of the server 1 according to the one embodiment will be described. FIG. 27 is a flowchart for explaining an operation example of processes by the server 1 according to the one embodiment.

As illustrated in FIG. 27, in Step S1, the machine learning unit 13 executes the machine learning on the untrained model 11*a* obtained by the obtaining unit 12 without pruning.

The calculating unit 14 calculates the inference accuracy (recognition rate) $Acc_{wo}$ in cases where the pruning is not performed (Step S2).

The threshold calculating unit 14*a* sets the initial value of the trust radius (Step S3).

The threshold calculating unit 14*a* calculates the threshold T for each layer and the pruning error for each layer for setting the pruning rates (Step S4), and determines whether or not the L2 norm of the thresholds T of all layers is larger than the trust radius (Step S5). If the L2 norm of the thresholds T of all layers is equal to or smaller than the trust radius (NO in Step S5), the process proceeds to Step S7.

If the L2 norm of the thresholds T of all layers is larger than the trust radius (YES in Step S5), the threshold calculating unit 14*a* scales (updates) the thresholds such that the L2 norm of the thresholds T of all layers becomes equal to the trust radius (Step S6), and the process proceeds to Step S7.

In Step S7, the threshold calculating unit 14*a* provisionally calculates the pruning rate for each layer. For example, the threshold calculating unit 14*a* provisionally sets the pruning rate for each layer among the set pruning rate candidates.

The calculating unit 14 determines whether or not the layers for which the pruning rates are provisionally calculated include a layer just before concat (Step S8). If the layers for which the pruning rates are provisionally calculated do not include a layer just before concat (NO in Step S8), the process proceeds to Step S11.

If the layers for which the pruning rates are provisionally calculated include a layer just before concat (YES in Step S8), the calculating unit 14 inserts a zero padding layer into an output of a layer just before concat (Step S9) and executes the process of Step S10, and then the process proceeds to Step S11.

In Step S10, the calculating unit 14 specifies multiple layers just before concat that are to input tensors into the same concat unit 154 for each concat unit 154 on the basis of the configuration information and the like. Then, the calculating unit 14 performs zero padding on a zero padding layer such that the numbers of elements (e.g., the numbers of channels) outputted from layers just before concat are made the same. Here, Steps S4 to S10 are an example of the above process (i).

The machine learning unit 13 prunes the trained model 11*c* at the pruning rates provisionally calculated by the threshold calculating unit 14*a*, and executes machine learning again on the model after the pruning. The calculating unit 14 calculates the inference accuracy $Acc_p$ of the model after the re-executed machine learning (Step 11).

The determining unit 14*b* determines whether or not the inference accuracy $Acc_p$+margin $Acc_m$ is equal to or higher than the inference accuracy $Acc_{wo}$ (Step S12). The evaluation of the inference accuracy (recognition rate) can compensate the mistakes in selecting the pruning rates due to the approximation error.

If the inference accuracy $Acc_p$+the margin $Acc_m$ is equal to or higher than the inference accuracy $Acc_{wo}$ (YES in Step S12), the determining unit 14*b* determines to prune the trained model 11*c* at the provisionally calculated pruning rates (Step S13), and stores, as the pruning rates 11*d*, the provisionally calculated pruning rates into the memory unit 11.

Further, the threshold calculating unit 14*a* increases the trust radius by multiplying the trust radius by a constant factor (Step S14), and the process proceeds to Step S17.

On the other hand, if the inference accuracy $Acc_p$+margin $Acc_m$ is lower than the inference accuracy $Acc_{wo}$ (NO in Step S12), the determining unit 14*b* discards the provisionally calculated pruning rates (Step S15). The threshold calculating unit 14*a* decreases the trust radius by multiplying the trust radius by a constant factor (Step S16), and the process proceeds to Step S17. Steps S10 to S16 are examples of the process of (ii) described above.

In Step S17, the determining unit 14*b* determines whether or not the search (processes of Steps S4 to S16) has been performed predetermined times, in other words, whether or not the predetermined condition is satisfied regarding the execution times of the processes including the threshold calculation, the pruning rate candidate selection, and the pruning rate determination. If the search has not been performed the predetermined times (NO in Step S17), the process moves to Step S4.

If the search has been performed the predetermined times (YES in Step S17), the outputting unit 15 outputs the determined pruning rates 11*d*(Step S18), and the process ends. Step S17 is an example of the process of (iii) described above.

As described above, by the threshold calculating unit 14*a*, the server 1 according to the one embodiment calculates the errors in the tensors used for the NN, which errors are generated by the pruning, and generates the thresholds from the values of the loss functions and the gradients obtained by the backpropagation of the NN. Further, the threshold calculating unit 14*a* compares the calculated errors in the pruning with the thresholds to provisionally calculate the pruning rates. Furthermore, the determining unit 14*b* compares the inference accuracy of the model after re-learning at the calculated pruning rates with the inference accuracy of the unpruned model, and determines the pruning rate for each layer. At this time, if the inference accuracy of the case with the pruning is determined to be deteriorated as compared to the inference accuracy of the case without the pruning, the threshold calculate unit 14*a* resets the upper limit of the threshold such that the thresholds is decreased, and searches for the pruning rates again.

Thus, the server 1 according to the one embodiment can determine the pruning rate for each layer regardless of the type of the layers. For example, the server 1 can determine the pruning rates to be applied to the trained model 11*c* that includes a convolutional layer to which no BN layer is connected, a fully connected layer, and the like for each individual layer.

Even if the NN includes at least one of the concat units 154, the server 1 can appropriately prune at least one of the layers just before concat so that the compression ratio of the data size of the down-sized model 11*e* can be enhanced.

<1-6> Modifications

Next, modifications according to the one embodiment will be described. The following description assumes, for simplicity, that the margin $Acc_m$ of the inference accuracy is "0", in other words, in comparing the inference accuracy, it is determined whether or not the inference accuracy $Acc_p$ is equal to or higher than the inference accuracy $Acc_{wo}$. In the following description, the NN is assumed not to include the concat unit, but the process described with reference to FIGS. 16-26 can be applied likewise to either one of the following first and second modifications.

<1-6-1> First Modification

In the method according to the one embodiment, the number of times of searches for the pruning rates (the number of attempts of the process (iii)) is a hyperparameter manually set by, for example, a designer. As a result, for example, if the number of times of searches is set to be small, the trained model 11*c* may be insufficiently downsized, and if the number of times of searches is set to be large, the trained model 11*c* may be sufficiently downsized, but search durations may become longer.

Figure 28:
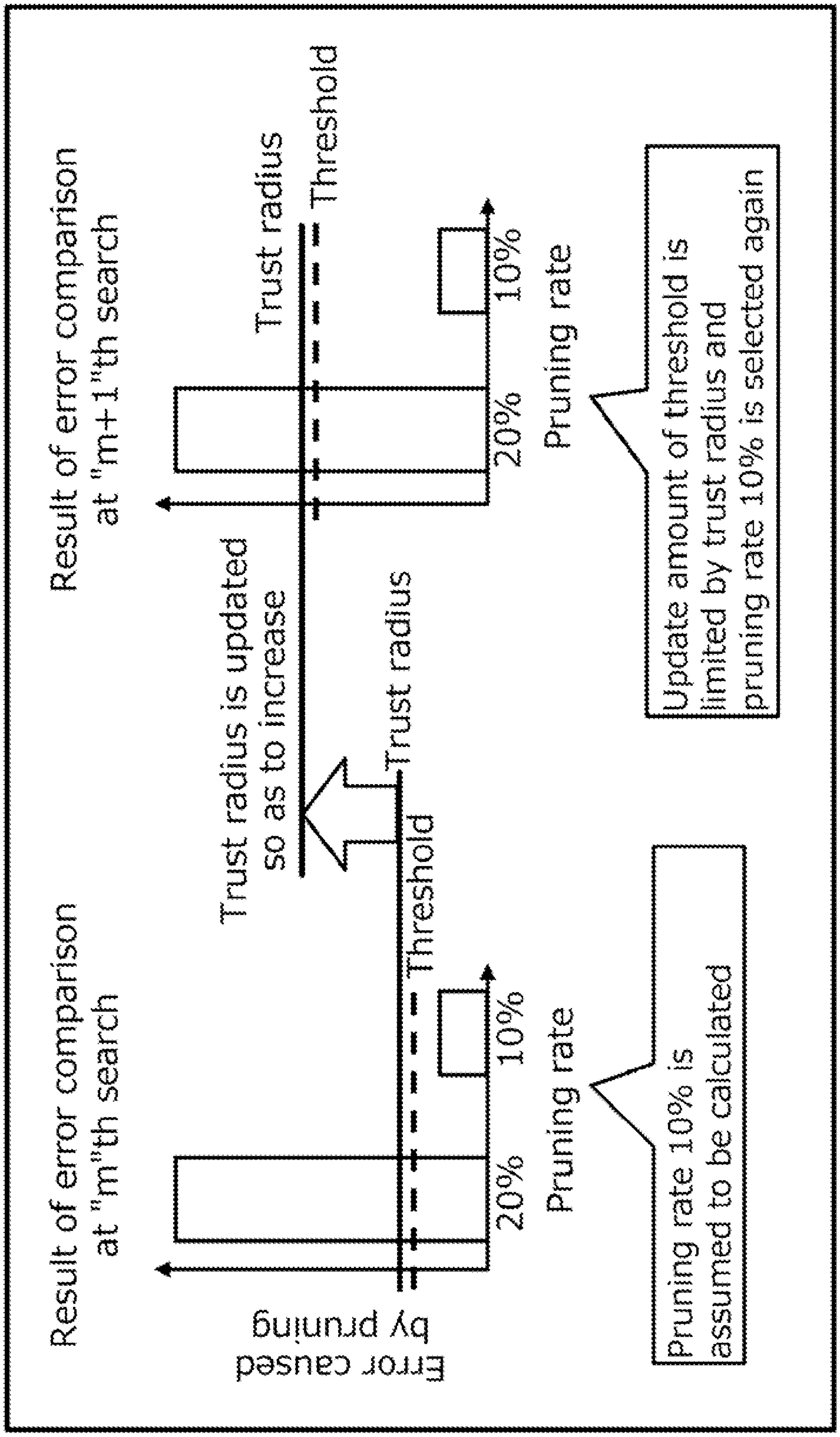
FIG. 28 is a diagram illustrating an example of a result of pruning error comparison in response to updating of a trust radius in the method according to the one embodiment.

FIG. 28 is a diagram illustrating an example of a result of the pruning error comparison in response to the update on the trust radius in the method according to the one embodiment.

As illustrated in FIG. 28, in the result of the error comparison at the "m"th (m is an integer equal to or greater than "1") search, the pruning rate of "10%" is assumed to be calculated (determined). In this case, the trust radius is updated so as to be increased by being multiplied by the constant K. However, if the trust radius after the update is smaller than the error according to the pruning rate candidate one size larger than the pruning rate candidate determined at the "m"th time, even in the result of the error comparison at the "m+1"th search, the pruning rate of "10%" is to be calculated again.

As such, when the trust radius is multiplied by the constant K or the constant k, the update amount of the threshold is limited by the trust radius, so that the same pruning rate candidates may be adopted in multiple searches. Such a state where combinations of the same pruning rates are searched for multiple times leads to an increase in the times of searches for the pruning rates while the pruning of the model is suppressed from being sufficiently attempted.

In view of this, a first modification describes, by focusing on the update on the trust radius, a method for shortening (decreasing) the search durations (the times of searches) for the pruning rates appropriate to downsize the NN.

Figure 29:
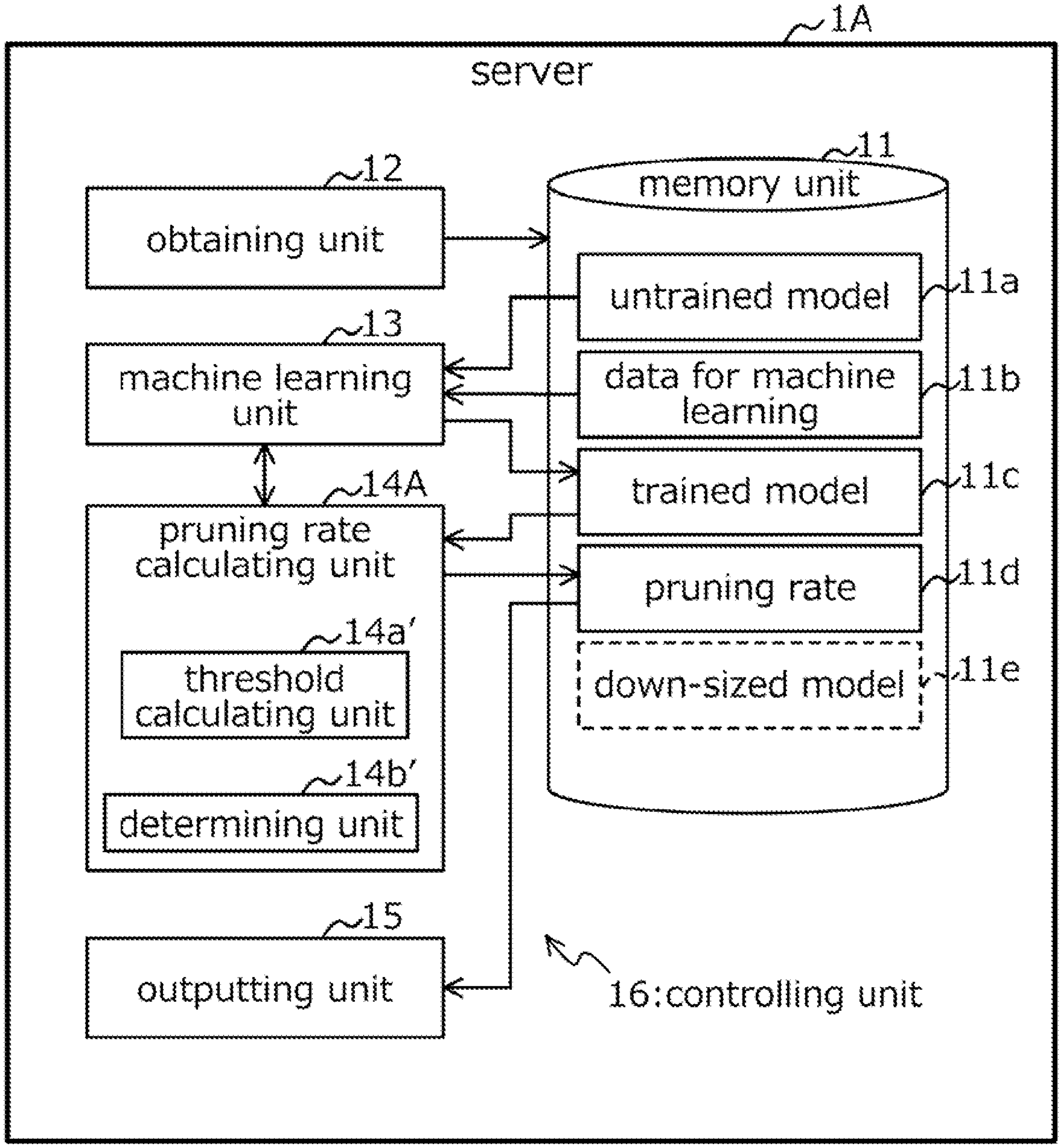
FIG. 29 is a block diagram illustrating an example of a functional configuration of a server according to a first modification.

FIG. 29 is a block diagram illustrating an example of a functional configuration of a server 1A according to the first modification. As illustrated in FIG. 29, the server 1A may include a calculating unit 14A that differs from the server 1 of FIG. 4. The calculating unit 14A may include a threshold calculating unit 14*a*' and a determining unit 14*b*' which differ from the calculating unit 14 of FIG. 4.

The calculating unit 14A searches for combinations of different pruning rates in each search. The state where the selected combination has the pruning rate of "0%" for all of the layers represents that the calculating unit 14A is assumed to determine not to search the pruning rates any more. Under such a premise, the calculating unit 14A (determining unit 14*b*') terminates the searching when the combination in which the pruning rate is "0%" for all of the layers is selected.

In accordance with the comparison result of the inference accuracy by the determining unit 14*b*', the threshold calculating unit 14*a*' measures, for each layer i (i is an integer equal to or greater than 1), an absolute value "$E_{diff,i}$" of a different amount between the threshold and the error in the pruning rate one size larger than the searched pruning rate or the error in the searched pruning rate.

For example, when the inference accuracy $Acc_p$ is equal to or higher than the inference accuracy $Acc_{wo}$, the threshold calculating unit 14*a*' measures the absolute value "$E_{diff,i}$" of the different amount between the threshold and the error in the pruning rate one size larger than the searched pruning rate.

On the other hand, when the inference accuracy $Acc_p$ is lower than the inference accuracy $Acc_{wo}$, the threshold calculating unit 14*a*' measures the absolute value "$E_{diff,i}$" of the different amount between the threshold and the error in the searched pruning rate.

As illustrated by the following equation (7), the threshold calculating unit 14*a*' acquires the smallest value (different amount) "$E_{diff}$" from the calculated absolute values "$E_{diff,i}$" of the different amounts of all layers.

$$E_{diff} = \min(E_{diff,1}, E_{diff,2}, \ldots , E_{diff,i}) \quad (7)$$

In accordance with the comparison result of the inference accuracy by the determining unit 14*b*', the threshold calculating unit 14*a*' updates the trust radius by adopting either one with a larger variation from the trust radius multiplied by a constant factor and the sum of or a difference between the trust radius and the different amount "$E_{diff}$".

For example, when the inference accuracy $Acc_p$ is equal to or higher than the inference accuracy $Acc_{wo}$, the threshold calculating unit 14*a*' adopts one with the larger variation from the trust radius multiplied by the constant K and the sum of the trust radius and the different amount "$E_{diff}$", and consequently, updates the trust radius so as to increase the trust radius.

On the other hand, when the inference accuracy $Acc_p$ is lower than the inference accuracy $Acc_{wo}$, the threshold calculating unit 14*a*' adopts one with the larger variation from the trust radius multiplied by the constant k and the difference between the trust radius and the different amount "$E_{diff}$", and consequently, updates the trust radius to so as to decrease the trust radius.

In this manner, the threshold calculating unit 14*a*' updates the trust radius such that the combinations of the pruning rate candidates of the multiple layers differ in each execution of selecting (in other words, searching) the pruning rate candidates.

Figure 30:
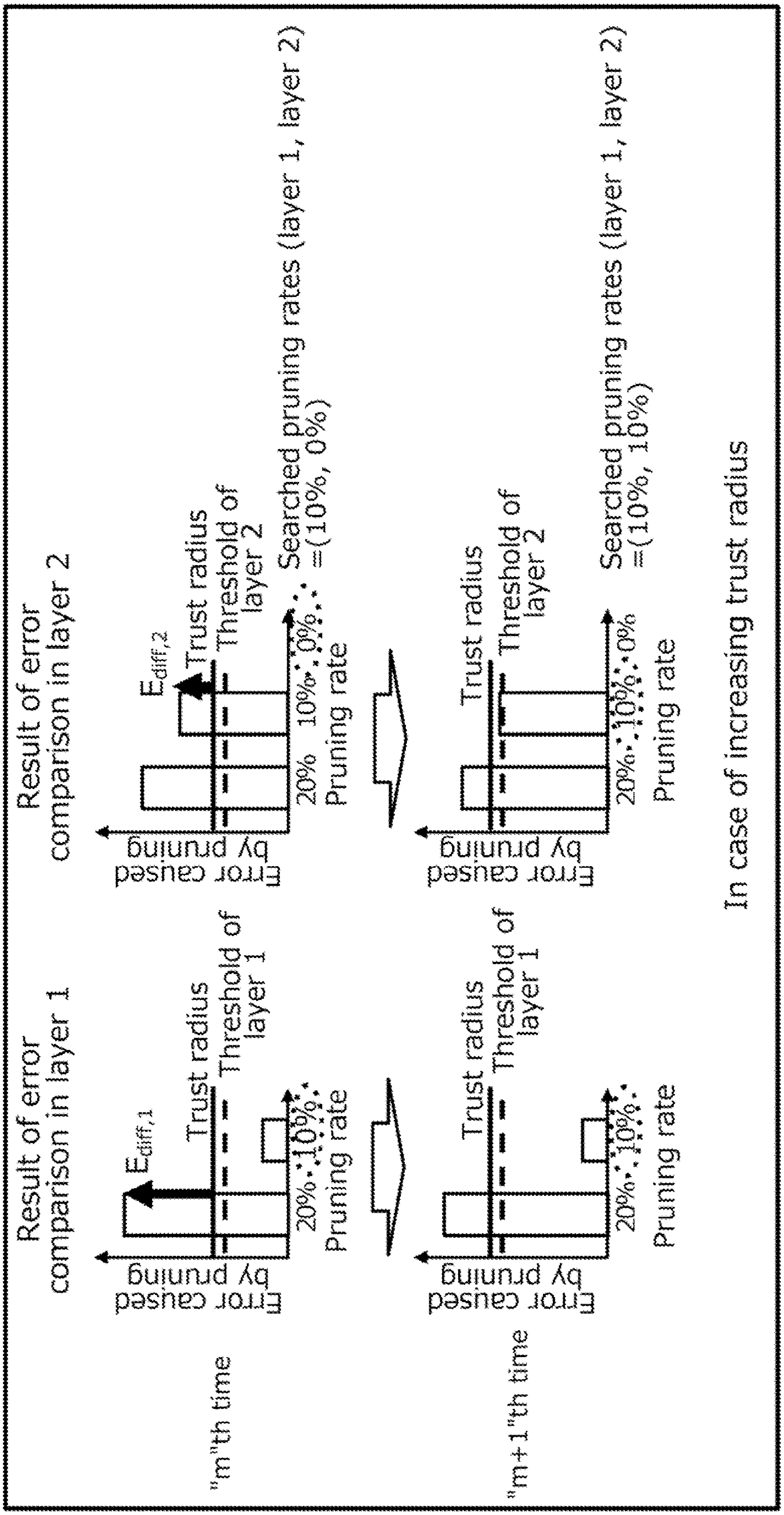
FIG. 30 is a diagram explaining an example of a trust radius update process in a case of increasing the trust radius.

FIG. 30 is a diagram explaining an example of a trust radius update process in case of increasing the trust radius. As illustrated in FIG. 30, it is assumed that the pruning rates searched at "m"th time are "(layer 1, layer 2)=(10%, 0%)". The threshold calculating unit 14*a*' calculates the absolute value "$E_{diff}$, 1" of the different amount between the trust radius and the error in the pruning rate "20%" for the layer 1, and the absolute value "$E_{diff}$, 2" of the different amount between the trust radius and the error in the pruning rate "10%" for the layer 2. In accordance with the above equation (7), the threshold calculating unit 14*a*' acquires, as the "$E_{diff}$", the different amount "$E_{diff}$, 2" having a smaller value.

Then, the threshold calculating unit 14*a*' determines (updates) the trust radius at the "m+1"th (next) time according to the following equation (8).

$$\text{(Trust radius at "}m+1\text{"}th\text{ time)}=\max(\text{(Trust radius at "}m\text{"}th\text{ time Constant }K),\text{(Trust radius at "}m\text{"}th\text{ time}+E_{diff})) \quad (8)$$

As a result, at least a value equal to or greater than the "sum of the trust radius and the different amount" is selected as the trust radius at the "m+1"th time, so that in the "m+1"th time, a bit width different from the "m"th time is calculated as the pruning rate.

In the example of FIG. 30, the trust radius (upper limit of the threshold) at the "m+1"th search coincides with the error in the pruning rate "10%" for the layer 2. Therefore, at the "m+1"th search, the pruning rates "(layer 1, layer 2)=(10%, 10%)", which compose the combination of the pruning rates different from the previous time, are searched.

Figure 31:
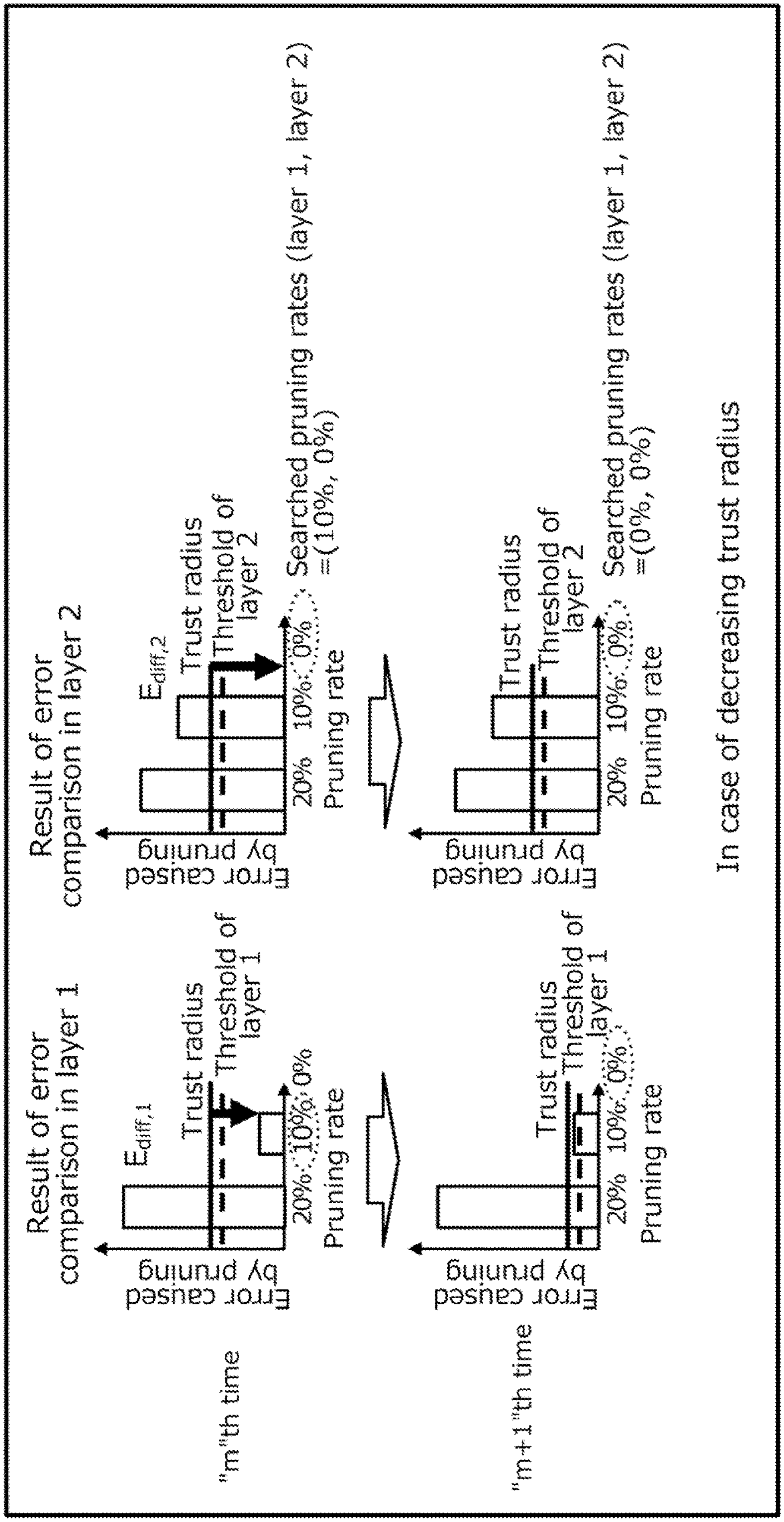
FIG. 31 is a diagram explaining an example of the trust radius update process in a case of decreasing the trust radius.

FIG. 31 is a diagram explaining an example of the trust radius update process in a case of decreasing the trust radius. As illustrated in FIG. 31, the pruning rates searched at the "m"th time are assumed to be "(layer 1, layer 2)=(10%, 0%)". The threshold calculating unit 14*a*' calculates the absolute value "$E_{diff}$, 1" of the different amount between the trust radius and the error in the pruning rate "10%" for the layer 1, and the absolute value "$E_{diff}$, 2" of the different amount between the trust radius and the error in the pruning rate "0%" for the layer 2. In accordance with the above equation (7), the threshold calculating unit 14$a'$ acquires, as the "$E_{diff}$", the different amount "$E_{diff}$, 1" having a smaller value.

Then, the threshold calculating unit 14$a'$ determines (updates) the trust radius at the "m+1"th (next) time according to the following equation (9).

$$\text{(Trust radius at "}m{+}1\text{"}th\text{ time)}=\max(\text{(Trust radius at "}m\text{"}th\text{ time}\cdot\text{Constant factor)},\text{(Trust radius at "}m\text{"}th\text{ time}-E_{diff}\text{)}) \quad (9)$$

As a result, at least a value equal to or greater than the "difference between the trust radius and the different amount" is selected as the trust radius at the "m+1"th time, so that in the "m+1"th time, a bit width different from the "m"th time is calculated as the pruning rate.

In the example of FIG. 31, the trust radius (upper limit of the threshold) at the "m+1"th search coincides with the error in the pruning rate "0%" for the layer 1. Therefore, at the "m+1"th search, the pruning rates "(layer 1, layer 2)=(0%, 0%), which compose the combination of the pruning rates different from the previous time, are searched.

When the above equations (8) and (9) are generalized, the trust radius at the next time can be expressed by the following equation (10).

$$\text{Trust radius at next time} = \text{Current trust radius} * \max(\text{Constant factor, Qscale\_min}) \quad (10)$$

In the above equation (10), the constant factor is K or k, "Qscale_min" is "Qscale" represented by the following equation (11), and "Qscale" is represented by the following equation (12).

$$\text{Qscale\_min} = \min(\text{Qscale calculated in all quantization target vectors}) \quad (11)$$

$$\text{Qscale} = 1 + \text{Qdiff/Qth} \quad (12)$$

In the above equation (12), "Qdiff" is the "different amount between the threshold and the quantization error in a bit width one size narrower than the provisionally calculated bit width (pruning ratio)", and "Qth" is the threshold.

Figure 32:
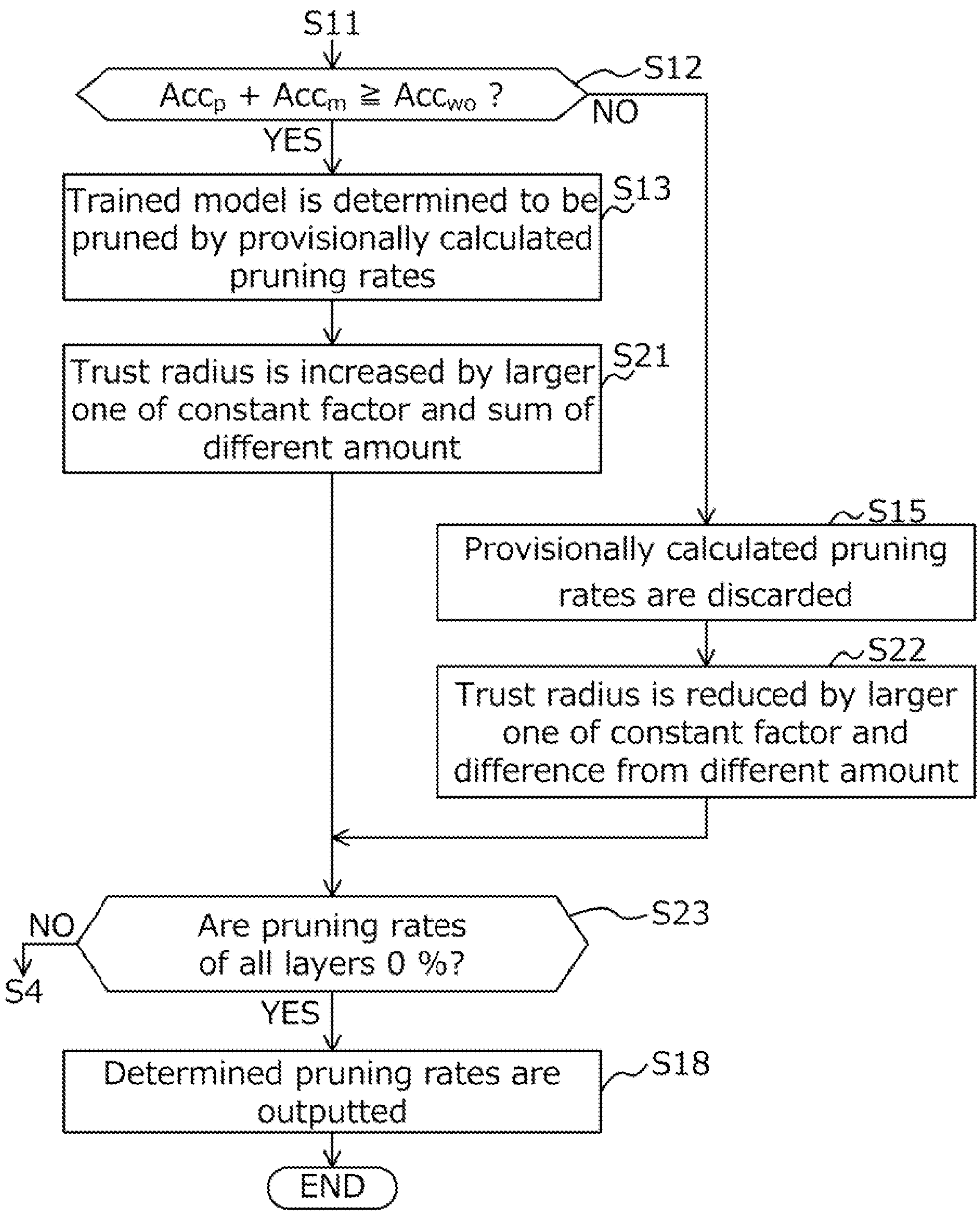
FIG. 32 is a flowchart for explaining an operation example of processes by the server according to the first modification.

Next, referring to FIG. 32, an operation example of the server 1A according to the first modification will be described. FIG. 32 is a flowchart for explaining an operation example of the processes by the server 1A according to the first modification. FIG. 32 corresponds to the flowchart in which Steps S14, S16 and S17 of the flowchart according to the server 1 illustrated in FIG. 27 are replaced with Steps S21, S22, and S23, respectively. Also in the first modification, the threshold calculating unit 14$a'$ sets the initial value of the trust radius in Step S3.

In Step S21, the threshold calculating unit 14$a'$ increases the trust radius by using larger one of the multiplication of the constant K and the "sum of the different amount", and the process proceeds to Step S23.

In Step S22, the threshold calculating unit 14$a'$ decreases the trust radius by using larger one of the multiplication of the constant k and the "difference from the different amount", and the process proceeds to Step S23.

In Step S23, the determining unit 14$b'$ determines whether or not the pruning rates 11$d$ of all layers are "0%", in other words, whether or not the pruning rates satisfy the predetermined condition. If the pruning rate 11$d$ of at least one layer is not "0%" (NO in Step S23), the process moves to Step S4.

If the pruning rates 11$d$ of all layers are "0%" (YES in Step S23), the outputting unit 15 outputs the determined pruning rates 11$d$ (Step S18), and the process ends.

As described above, the first modification differs from the one embodiment in the method for updating the trust radius by the threshold calculating unit 14$a'$ and the end condition for determining the end of searching by the determining unit 14$b'$. Thus, the server 1A can search for the pruning rates appropriate for sufficiently downsizing the NN in shortest durations (least number of times). In addition, it is possible to omit the setting (designation) of the times of searches by the designer or the like.

<1-6-2> Second Modification

In the methods according to the one embodiment and the first modification, the initial value of the trust radius is a hyperparameter set by a designer or the like.

Even when the times of searches are the same, the model size may differ between the cases where the initial value of the trust radius is set to be large and where the initial value of the trust radius is set to be small. In addition, when the initial value of the trust radius is set to be large, the times of searches required for the model size to be sufficiently diminished may increase as compared with the case where the initial value of the trust radius is set to be small.

As such, depending on the initial value of the trust radius, the final model size and the times of searches for the pruning rates may vary, in other words, the performance of the servers 1 and 1A may varies.

Therefore, a second modification describes a method for suppressing variation in the performance of the servers 1 and 1A.

Figure 33:
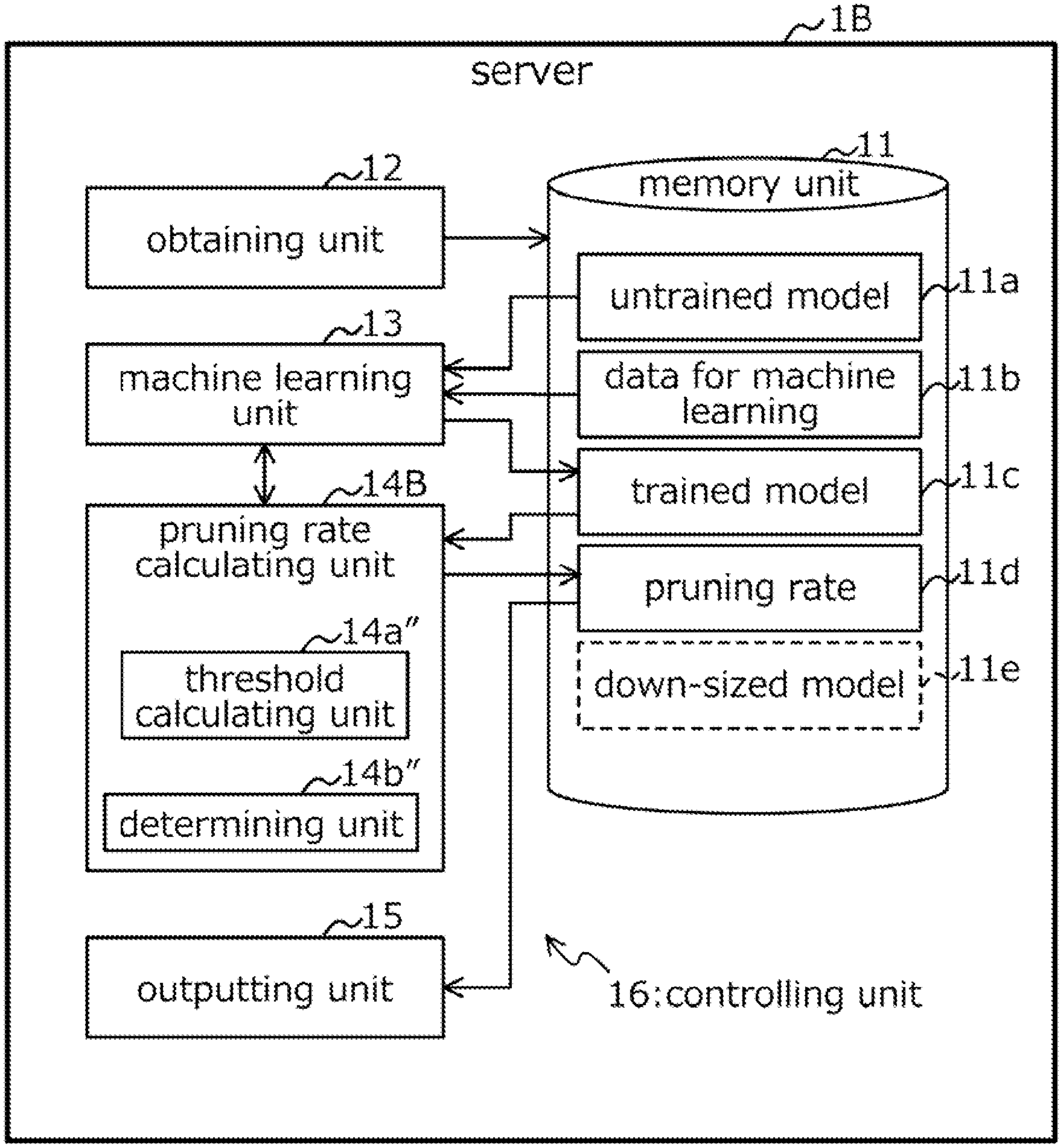
FIG. 33 is a block diagram illustrating an example of a functional configuration of a server according to a second modification.

FIG. 33 is a block diagram illustrating an example of a functional configuration of a server 1B according to the second modification. As illustrated in FIG. 33, the server 1B may include a calculating unit 14B different from the server 1 of FIG. 4. The calculating unit 14B may include a threshold calculating unit 14$a''$ and a determining unit 14$b''$, which differ from the calculating unit 14 of FIG. 4.

In pruning a model, it is known that gradually pruning the model by using low pruning rates can maintain accuracy and compress the model at a high compression rate as compared with pruning the model at once by using high pruning rates.

As illustrated in the above equation (5), since the threshold T is set according to the reciprocal of the gradient, layers with large thresholds T represent layers with small gradients. The layers with small gradients have small effect on the accuracy even when pruned.

Therefore, the server 1B (threshold calculating unit 14$a''$) sets, for example, the initial value of the trust radius to be a value such that the pruning rate in the first search becomes the minimum. For this, the threshold calculating unit 14$a''$ may, for example, set the initial value of the trust radius to be a value that causes, among all layers, the layer where the threshold T is the maximum to be pruned and the remaining layer(s) to be unpruned (such that the pruning rates become "0%").

By setting the initial value of the trust radius as described above, the server 1B can further compress the model size or maintain the accuracy as compared to the case where the initial value of the trust radius is manually set, for example, to be large.

Figure 34:
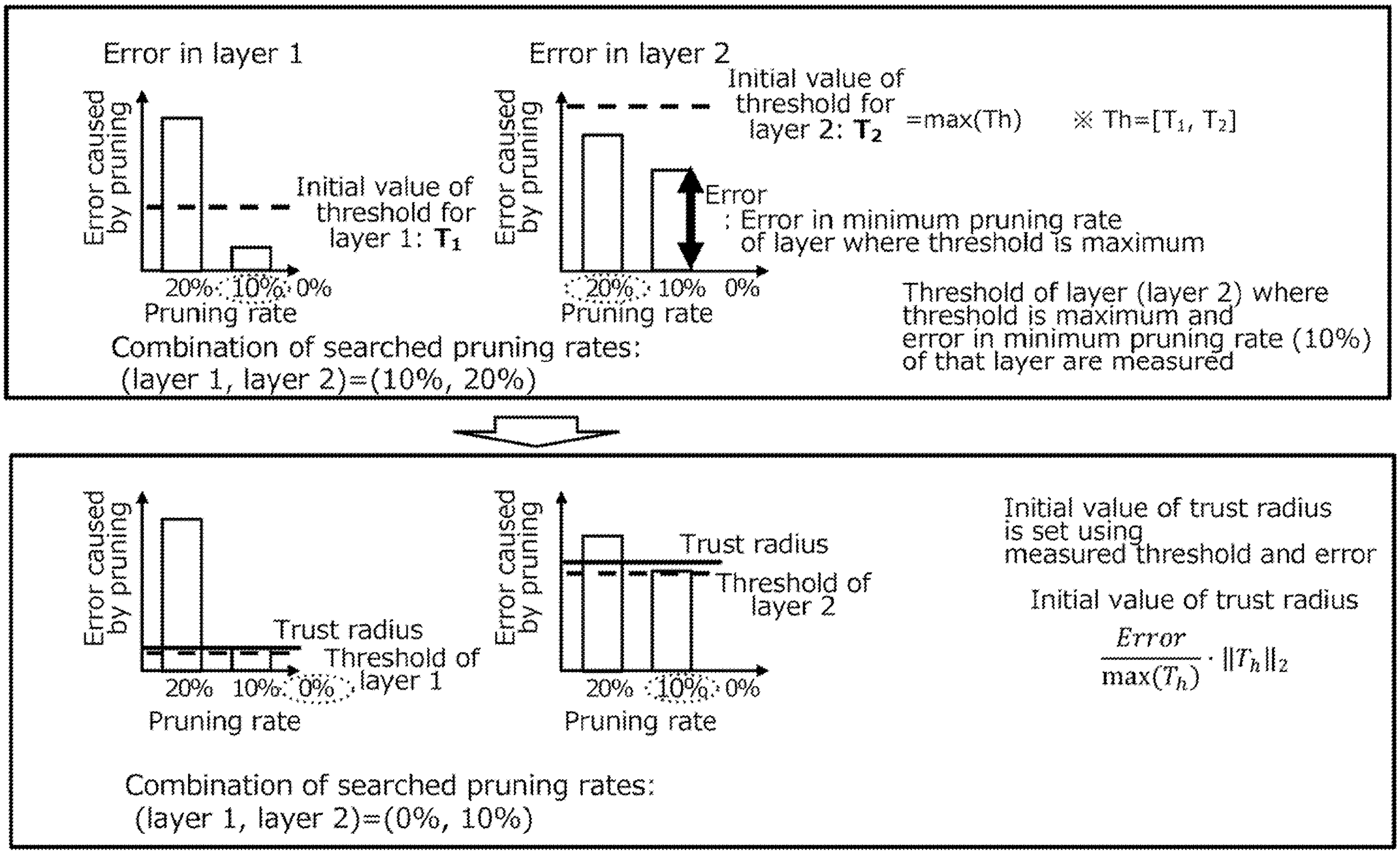
FIG. 34 is a diagram explaining an example of a setting of the initial value of the trust radius.

FIG. 34 is a diagram explaining an example of a setting of the initial value of the trust radius. As illustrated in the upper part of FIG. 34, when the initial value of the trust radius is not set, the combination of the pruning rates to be searched is "(layer 1, layer 2)=(10%, 20%)".

As illustrated in FIG. 34, in the first search for the pruning rates, the threshold calculate unit 14*a*" measures, among all layers, the threshold (max(Th)) of the layer where the threshold is the maximum and the error (Error) caused by the minimum (except for "0%") pruning rate in the layer.

Th represents a vector according to the threshold $T_1$, $T_2$, . . . for each layer, and in the example of FIG. 34, Th=[$T_1$, $T_2$]. The threshold (max(Th)) is the threshold for the layer where the threshold is the maximum, and is $T_2$ in the example of FIG. 34. The error (Error) is the error in the minimum pruning rate for the layer where the threshold is the maximum, and in the example of FIG. 34, the error in the pruning rate "10%" for the layer 2 is measured.

Next, using the measured threshold and the error, the threshold calculating unit 14*a*" sets the initial value of the trust radius according to the following equation (13). In the following equation (13), "$\|Th\|_2$" is the L2norm of the thresholds of all layers.

[Equation 7]

$$\text{Initial value of trust radius} = \frac{\text{Error}}{\max(T_h)} \cdot \|T_h\|_2 \tag{13}$$

The threshold calculating unit 14*a*" sets the thresholds $T_1$, $T_2$such that the minimum pruning rate "10%" is selected as the pruning rate of the layer having the maximum threshold (layer 2) and the pruning rate "0%" is selected in the remaining layer (layer 1) by the initial value of the calculated trust radius.

Thus, as illustrated in the lower part of FIG. 34, when the initial value of the trust radius is set and the thresholds $T_1$, $T_2$are set, the combination of the pruning rates to be searched becomes "(layer 1, layer 2)=(0%, 10%)". Since the layer (layer 2) of the pruning target is the layer where the threshold is the maximum, in other words, the gradient is the minimum, the effect on the accuracy by the pruning can be suppressed small.

The function of the threshold calculating unit 14*a*" other than the process of setting the initial value of the trust radius may be similar to the function of at least one of the threshold calculating unit 14*a* according to the one embodiment and the threshold calculating unit 14*a*' according to the first modification. The determining unit 14*b*" may be similar to at least one of the determining unit 14*b* according to the one embodiment and the determining unit 14*b*' according to the first modification.

That is, the method according to the second modification may be realized by a combination of one of or both the one embodiment and the first modification.

Figure 35:
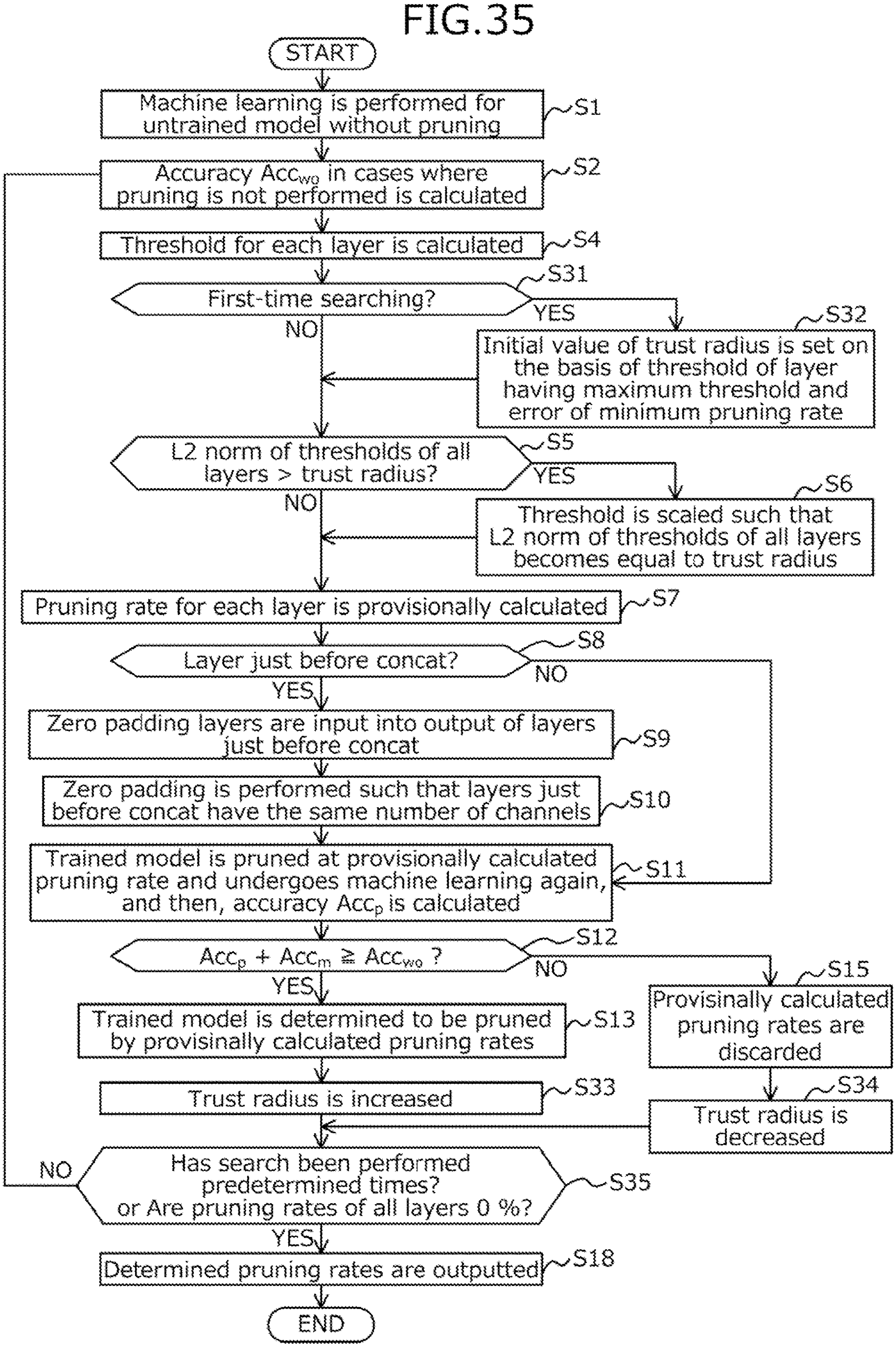
FIG. 35 is a flowchart for explaining an operation example of processes by the server according to the second modification.

Next, referring to FIG. 35, an operation example of the server 1B according to the second modification will be described. FIG. 35 is a flowchart for explaining an operation example of the processes by the server 1B according to the second modification. FIG. 35 corresponds to the flowchart in which, of the flowchart according to the server 1 illustrated in FIG. 27, Step S3 is deleted, Steps S31 and S32 are added between Steps S4 and S5, and Steps S14, S16, and S17 are replaced with Steps S33, S34, and S35, respectively.

In Step S31, after calculating the threshold for each layer in Step S4, the threshold calculating unit 14*a*" determines whether or not the search is the first time. When the search is not the first time (NO in Step S31), the process proceeds to Step S5.

When the search is the first time (YES in Step S31), the threshold calculating unit 14*a*" sets the initial value of the trust radius based on the threshold and the minimum pruning rate error in the layer where the threshold is the maximum (Step S32), and the process proceeds to Step S5.

Steps S33, S34, and S35 may be either Steps S14, S16, and S17 illustrated in FIG. 27 or Steps S21, S22, and S23 illustrated in FIG. 32, respectively.

As described above, the second modification uses the method for setting the initial value of the trust radius by the threshold calculating unit 14*a*" that differs from the methods of the first embodiment and the first modification. Thus, the server 1B can suppress variation in the final model size and the times of searches for the pruning rates, and can suppress variation in the performance of the servers 1 and 1A.

Furthermore, the server 1B can suppress manual setting of the initial value (hyperparameter) of the trust radius by a designer or the like, and can dynamically set the initial value of the trust radius according to the layers of the trained models 11*c*. Therefore, appropriate pruning rates can be set for each model, and regardless of the model, the variation in the final model size and the times of searches for the pruning rates can be suppressed, so that variation in the performance of the servers 1 and 1A can be suppressed.

<1-7> Example of Hardware Configuration

The servers 1, 1A, and 1B according to the one embodiment and the first and second modifications may each be a virtual machine (VM; Virtual Machine) or a physical machine. The functions of the servers 1, 1A, and 1B may be realized by one computer or by two or more computers. At least some of the functions of the servers 1, 1A, and 1B may be implemented using HW (Hardware) resources and NW (Network) resources provided by cloud environments.

Figure 36:
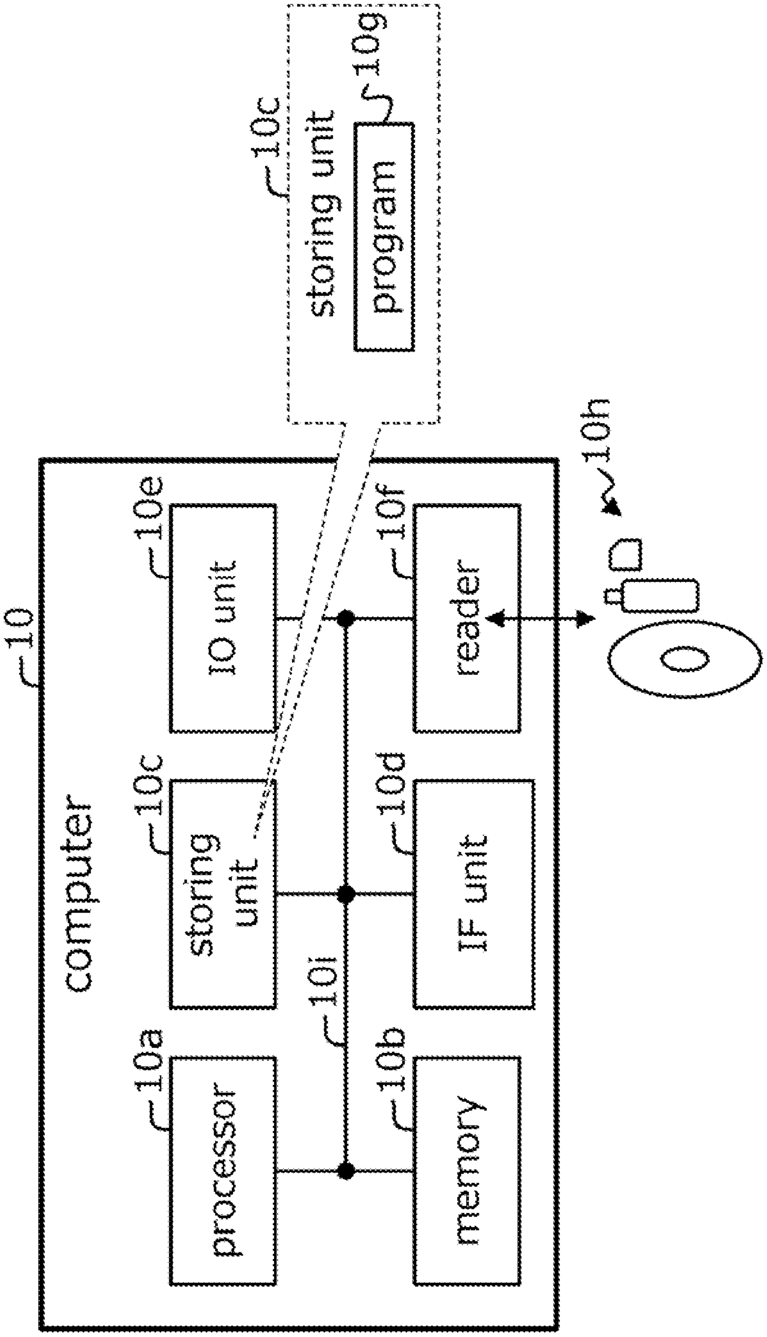
FIG. 36 is a block diagram illustrating an example of a hardware (HW) configuration of a computer.

FIG. 36 is a block diagram illustrating an example of a hardware configuration of a computer 10. Hereinafter, the computer 10 is exemplified as the hardware (HW) that realizes each function of the servers 1, 1A, and 1B. When multiple computers are used as the HW resources for realizing each function of the servers 1, 1A, and 1B, each computer may include the HW configuration illustrated in FIG. 36.

As illustrated in FIG. 36, the computer 10 may illustratively include, as the HW configuration, a processor 10*a*, a memory 10*b*, a storing unit 10*c*, an IF (Interface) unit 10*d*, an IO (Input/Output) unit 10*e*, and a reader 10*f*.

The processor 10*a* is an example of an arithmetic processing device that performs various controls and calculations. The processor 10*a* may be connected to each block in the computer 10 via a bus 10*i* so as to mutually communicable. The processor 10*a* may be a multi-processor including multiple processors or a multi-core processor having multiple processor cores, or may be configured to have multiple multi-core processors.

The processor 10*a* may be, for example, an integrated circuit (IC; Integrated Circuit) such as a CPU (Central Processing Unit), an MPU (Micro Processing Unit), a GPU (Graphics Processing Unit), an APU (Accelerated Processing Unit), a DSP (Digital Signal Processor), an ASIC (Application Specific IC), or an FPGA (Field-Programmable Gate Array).

As the processor 10*a*, a combination of two or more of the integrated circuits described above may be used. As an example, the computer 10 may include first and second processors 10*a*. The first processor 10*a* is an example of a CPU that executes a program 10*g* (machine learning program) that realizes all or a part of various functions of the computer 10. For example, based on the programs 10*g*, the first processor 10*a* may realize the functions of the obtaining unit 12, the calculating unit 14, 14A or 14B, and the outputting unit 15 of the server 1, 1A or 1B (see FIG. 4, 29, or 33). The second processor 10*a* is an example of an accelerator that executes an arithmetic process used for NN calculation such as matrix calculation, and may realize, for example, the function of the machine learning unit 13 of the server 1, 1A, or 1B (see FIG. 4, 29, or 33).

The memory 10*b* is an example of an HW that stores various data and programs. The memory 10*b* may be, for example, at least one of a volatile memory such as a DRAM (Dynamic Random Access Memory) and a nonvolatile memory such as a PM (Persistent Memory).

The storing unit 10*c* is an example of an HW that stores information such as various data and programs. The storing unit 10*c* may be, for example, a magnetic disk device such as an HDD (Hard Disk Drive), a semiconductor drive device such as an SSD (Solid State Drive), or various storage devices such as nonvolatile memories. The non-volatile memory may be, for example, a flash memory, an SCM (Storage Class Memory), a ROM (Read Only Memory), or the like.

The storing unit 10*c* may store the program 10*g*. For example, the processor 10*a* of the servers 1, 1A, and 1B can realize functions as the controlling unit 16 of the servers 1, 1A, and 1B (see FIG. 4, 29, or 33) by expanding the program log stored into the storing unit 10*c* onto the memory 10*b* and executing the program 10*g*.

The memory unit 11 illustrated in FIG. 4, 29, or 33 may be realized by a storage area included in at least one of the memory 10*b* and the storing unit 10*c*.

The IF unit 10*d* is an example of a communication IF that controls the connection and communication with the network. For example, the IF unit 10*d* may include an adapter compatible with a LAN (Local Area Network) such as Ethernet (registered trademark), an optical communication such as FC (Fibre Channel), or the like. The adapter may be adapted to a communication scheme of at least one of a wireless scheme and a wired scheme. For example, the servers 1, 1A, and 1B may be connected to a non-illustrated computer via the IF unit 10*d* so as to be mutually communicable. One or both of the functions of the obtaining unit 12 and the outputting unit 15 illustrated in FIG. 4, 29, or 33 may be realized by the IF unit 10*d*. For example, the program 10*g* may be downloaded from a network to the computer 10 via the communication IF and stored into the storing unit 10*c*.

The IO unit 10*e* may include one of an input device and an output device, or both. The input device may be, for example, a keyboard, a mouse, or a touch panel. The output device may be, for example, a monitor, a projector, or a printer. For example, the outputting unit 15 illustrated in FIG. 4, 29, or 33 may output the pruning rates 11*d* to the output device of the IC unit 10*e* to display the pruning rates 11*d*.

The reader 10*f* is an example of a reader that reads out information on the data and programs recorded on the recording medium 10*h*. The reader 10*f* may include a connection terminal or a device to which the recording medium 10*h* can be connected or inserted. The reader 10*f* may be, for example, an adapter compatible with a USB (Universal Serial Bus) or the like, a drive device that accesses a recording disk, a card reader that accesses a flash memory such as an SD card, etc. The recording medium 10*h* may store the program 10*g*, or the reader 10*f* may read the program 10*g* from the recording medium 10*h* and store it into the storing unit 10*c*.

The recording medium 10*h* may illustratively be a non-transitory computer-readable recording medium such as a magnetic/optical disk or a flash memory. The magnetic/optical disk may illustratively be a flexible disk, a CD (Compact Disc), a DVD (Digital Versatile Disc), a Blu-ray disk, an HVD (Holographic Versatile Disc), or the like. The flash memory may illustratively be a solid state memory such as a USB memory or an SD card.

The HW configuration of the computer 10 described above is merely illustrative. Thus, the HW of the computer may appropriately undergo increase or decrease (e.g., addition or deletion of arbitrary blocks), division, integration in arbitrary combinations, and addition or deletion of the bus. For example, the servers 1, 1A, and 1B may omit at least one of the IC unit 10*e* and the reader 10*f*.

<2> Miscellaneous

The above-described technique according to the embodiment and the first and second modifications can be modified and implemented as follows.

For example, the obtaining unit 12, the machine learning unit 13, the calculating unit 14, 14A or 14B, and the outputting unit 15 included in the server 1, 1A or 1B illustrated in FIG. 4, 29, or 33 may be merged or may each be divided.

For example, the server 1, 1A, or 1B illustrated in FIG. 4, 29, or 33 may be configured to realize each processing function by multiple devices cooperating with each other via networks. As an example, in the server 1, 1A, or 1B, the obtaining unit 12 and the outputting unit 15 may be a web server and an application server, the machine learning unit 13 and the calculating unit 14, 14A or 14B may be an application server, the memory unit 11 may be a database server, or the like. In this case, the web server, the application server, and the DB server may realize the processing function as the server 1, 1A, or 1B by cooperating with each other via networks.

Further, the method for applying the zero padding process to an NN including the concat unit 154, which has been described with reference to FIGS. 16-26, is not limited to the application to the pruning process accomplished by the servers 1, 1A, and 1B respectively illustrated in FIGS. 4, 29, and 33. Alternatively, for example, the method for applying the zero padding process may be applied to various methods for determining the pruning rates for each layer of an NN.

As one aspect, the present disclosure can realize downsizing of a neural network including multiple layers.

Throughout the descriptions, the indefinite article "a" or "an", or adjective "one" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a machine learning program, when executed by a processor, for causing a computer to execute a process comprising:

obtaining a pruning ratio in a unit of a layer, the pruning ratio representing a reduction ratio of each element of a plurality of layers in a trained model of a neural network including the plurality of layers, the neural network including a calculating process that outputs a tensor serving as a result of a given calculation on a plurality of tensors to be inputted into the calculating process and being inputted with tensors outputted from a plurality of first layers preceding the calculating process into the calculating process, the plurality of first layers being included in the plurality of layers and including the preceding layer of the calculating process and one or more layers preceding the preceding layer, the one or more layers being shortcut-connected to the calculating process;

inserting one of a plurality of second layers between each of the plurality of first layers and the calculating process, each of the plurality of second layers performing a zero padding process that pads one or more given elements of the tensors with zero, the plurality of second layers each being associated with each of the plurality of first layers; and padding each of the plurality of second layers with one or more zero matrices such that a number of elements of each of a plurality of tensors inputted into the calculating process from the plurality of first layers of which elements are reduced, the elements being reduced in accordance with the corresponding pruning ratio to each of the first layers, becomes a largest number of elements among the plurality of tensors outputted from the plurality of first layers after the reducing of the elements, re-training a reduced model which is obtained by reducing one or more elements of the plurality of layers in the trained model according to the obtained pruning rate; and determining a pruning rate to be applied to each of the plurality of layers based on inference accuracy of the trained model and inference accuracy of the reduced model having undergone the re-training, the largest number of elements is a number obtained by subtracting a number of elements of a first index common in index representing a position to the plurality of first layers among one or more elements to be reduced in the plurality of first layers from a number of elements when no element is reduced in the plurality of first layers, the padding includes inserting, when an element of a second index representing a position different from a position represented by the first index is not to be reduced in at least one third layer serving as the preceding layer among the plurality of first layers, a zero matrix into the second index of a fourth layer preceding the third layer and serving as one or more layers and being shortcut-connected to the calculating process among the plurality of first layers except for the third layer, the calculating process is a concatenate calculation, the plurality of first layers are a plurality of layers just before the concatenate calculation, and the plurality of second layers are a plurality of zero padding layers.

2. The non-transitory computer-readable recording medium according to claim 1, wherein the process further comprises suppressing execution of the padding on one or more of the plurality of second layers associated with one or more of the plurality of first layers after the reducing of the elements, the one or more first layers each having a number of elements of a tensor to be outputted equal to the largest number of elements.

3. The non-transitory computer-readable recording medium according to claim 1, wherein the elements are selected from a group consisting of a channel, a weight, and a node.

4. A computer-implemented method for machine learning comprising:

obtaining a pruning ratio in a unit of a layer, the pruning ratio representing a reduction ratio of each element of a plurality of layers in a trained model of a neural network including the plurality of layers, the neural network including a calculating process that outputs a tensor serving as a result of a given calculation on a plurality of tensors to be inputted into the calculating process and being inputted with tensors outputted from a plurality of first layers preceding the calculating process into the calculating process, the plurality of first layers being included in the plurality of layers and including the preceding layer of the calculating process and one or more layers preceding the preceding layer, the one or more layers being shortcut- connected to the calculating process;

inserting one of a plurality of second layers between each of the plurality of first layers and the calculating process, each of the plurality of second layers performing a zero padding process that pads one or more given elements of the tensors with zero, the plurality of second layers each being associated with each of the plurality of first layers; and padding each of the plurality of second layers with one or more zero matrices such that a number of elements of each of a plurality of tensors inputted into the calculating process from the plurality of first layers of which elements are reduced, the elements being reduced in accordance with the corresponding pruning ratio to each of the first layers, becomes a largest number of elements among the plurality of tensors outputted from the plurality of first layers after the reducing of the elements, re-training a reduced model which is obtained by reducing one or more elements of the plurality of layers in the trained model according to the obtained pruning rate; and determining a pruning rate to be applied to each of the plurality of layers based on inference accuracy of the trained model and inference accuracy of the reduced model having undergone the re-training, the largest number of elements is a number obtained by subtracting a number of elements of a first index common in index representing a position to the plurality of first layers among one or more elements to be reduced in the plurality of first layers from a number of elements when no element is reduced in the plurality of first layers, and the padding includes inserting, when an element of a second index representing a position different from a position represented by the first index is not to be reduced in at least one third layer serving as the preceding layer among the plurality of first layers, a zero matrix into the second index of a fourth layer preceding the third layer and serving as one or more layers and being shortcut-connected to the calculating process among the plurality of first layers except for the third layer, the calculating process is a concatenate calculation, the plurality of first layers are a plurality of layers just before the concatenate calculation, and the plurality of second layers are a plurality of zero padding layers.

5. The computer-implemented method according to claim 4, further comprising suppressing execution of the padding on one or more of the plurality of second layers associated with one or more of the plurality of first layers after the reducing of the elements, the one or more first layers each having a number of elements of a tensor to be outputted equal to the largest number of elements.

6. The computer-implemented method according to claim 4, wherein the elements are selected from a group consisting of a channel, a weight, and a node.

7. An information processing apparatus comprising:

a memory; and a processor coupled to the memory, the processor being configured to:

obtain a pruning ratio in a unit of a layer, the pruning ratio representing a reduction ratio of each element of a plurality of layers in a trained model of a neural network including the plurality of layers, the neural network including a calculating process that outputs a tensor serving as a result of a given calculation on a plurality of tensors to be inputted into the calculating process and being inputted with tensors outputted from a plurality of first layers preceding the calculating process into the calculating process, the plurality of first layers being included in the plurality of layers and including the preceding layer of the calculating process and one or more layers preceding the preceding layer, the one or more layers being shortcut- connected to the calculating process;

inserting one of a plurality of second layers between each of the plurality of first layers and the calculating process, each of the plurality of second layers performing a zero padding process that pads one or more given elements of the tensors with zero, the plurality of second layers each being associated with each of the plurality of first layers; and padding each of the plurality of second layers with one or more zero matrices such that a number of elements of each of a plurality of tensors inputted into the calculating process from the plurality of first layers of which elements are reduced, the elements being reduced in accordance with the corresponding pruning ratio to each of the first layers, becomes a largest number of elements among the plurality of tensors outputted from the plurality of first layers after the reducing of the elements, re-training a reduced model which is obtained by reducing one or more elements of the plurality of layers in the trained model according to the obtained pruning rate; and determining a pruning rate to be applied to each of the plurality of layers based on inference accuracy of the trained model and inference accuracy of the reduced model having undergone the re-training, the largest number of elements is a number obtained by subtracting a number of elements of a first index common in index representing a position to the plurality of first layers among one or more elements to be reduced in the plurality of first layers from a number of elements when no element is reduced in the plurality of first layers, and the padding includes inserting, when an element of a second index representing a position different from a position represented by the first index is not to be reduced in at least one third layer serving as the preceding layer among the plurality of first layers, a zero matrix into the second index of a fourth layer preceding the third layer and serving as one or more layers and being shortcut-connected to the calculating process among the plurality of first layers except for the third layer, the calculating process is a concatenate calculation, the plurality of first layers are a plurality of layers just before the concatenate calculation, and the plurality of second layers are a plurality of zero padding layers.

8. The information processing apparatus according to claim 7, wherein the processor is further configured to suppress execution of the padding on one or more of the plurality of second layers associated with one or more of the plurality of first layers after the reducing of the elements, the one or more first layers each having a number of elements of a tensor to be outputted equal to the largest number of elements.

9. The information processing apparatus according to claim 7, wherein the elements are selected from a group consisting of a channel, a weight, and a node.

* * * * *